(12) United States Patent
Hazenberg et al.

(10) Patent No.: US 7,451,554 B2
(45) Date of Patent: Nov. 18, 2008

(54) FLUID SYSTEM HAVING AN EXPANDABLE PUMP CHAMBER

(75) Inventors: K. Pieter Hazenberg, Portland, OR (US); Frederick J. Dojan, Vancouver, WA (US)

(73) Assignee: Nike, Inc., Beaverton, OR (US)

( * ) Notice: Subject to any disclaimer, the term of this patent is extended or adjusted under 35 U.S.C. 154(b) by 479 days.

(21) Appl. No.: 11/255,091

(22) Filed: Oct. 19, 2005

(65) Prior Publication Data

US 2007/0084083 A1    Apr. 19, 2007

(51) Int. Cl.
    *A43B 13/20*    (2006.01)
(52) U.S. Cl. ............... 36/29; 36/35 B; 36/154
(58) Field of Classification Search ........ 36/29, 36/35 B, 154, 3 B
    See application file for complete search history.

(56) References Cited

U.S. PATENT DOCUMENTS

| 3,462,330 | A | 8/1969 | Greig et al. ........... 156/210 |
| 4,183,156 | A | 1/1980 | Rudy |
| 4,446,634 | A | 5/1984 | Johnson et al. |
| 4,507,880 | A | 4/1985 | Ohashi |
| 4,724,627 | A | 2/1988 | Sisco |
| 4,835,883 | A | 6/1989 | Tetrault et al. |
| 4,860,463 | A | 8/1989 | Pin |
| 4,888,887 | A | 12/1989 | Solow |
| 4,912,861 | A | 4/1990 | Huang |
| 4,995,173 | A | 2/1991 | Spier |
| 5,131,174 | A | 7/1992 | Drew et al. |
| 5,144,708 | A | 9/1992 | Pekar |
| 5,193,246 | A | 3/1993 | Huang |
| 5,335,382 | A | 8/1994 | Huang |
| 5,353,459 | A | 10/1994 | Potter et al. |
| 5,353,525 | A | 10/1994 | Grim |
| 5,363,570 | A | 11/1994 | Allen et al. |
| 5,406,661 | A | 4/1995 | Pekar |
| 5,524,364 | A | 6/1996 | Cole et al. |
| 5,558,395 | A | 9/1996 | Huang |
| 5,564,143 | A | 10/1996 | Pekar et al. |
| 5,625,964 | A | 5/1997 | Lyden et al. |
| 5,669,161 | A | 9/1997 | Huang |

(Continued)

FOREIGN PATENT DOCUMENTS

DE    1628141    4/1971

(Continued)

OTHER PUBLICATIONS

International Search Report for corresponding International Application No. PCT/US2006/038997.

*Primary Examiner*—Ted Kavanaugh
(74) *Attorney, Agent, or Firm*—Plumsea Law Group, LLC

(57) ABSTRACT

A fluid system for an article of footwear or other products is disclosed. In one aspect of the invention, the fluid system includes a pump chamber and a pressure chamber. The pump chamber is formed to exhibit a four layer structure to imparts an expandable configuration. The four layers are bonded to each other such that the sidewall has a zigzag-shaped configuration. In another aspect of the invention, the fluid system includes two pump chambers and a pressure chamber in order to increase the resulting pressure in the pressure chamber. In yet another aspect of the invention, at least one of the two pump chambers has an expandable configuration.

36 Claims, 16 Drawing Sheets

U.S. PATENT DOCUMENTS

| | | |
|---|---|---|
| 5,704,137 A | 1/1998 | Dean et al. |
| 5,794,361 A | 8/1998 | Sadler |
| 5,802,739 A | 9/1998 | Potter et al. ............... 36/29 |
| 5,826,349 A | 10/1998 | Goss |
| 5,830,553 A | 11/1998 | Huang |
| 5,845,417 A | 12/1998 | Reed et al. |
| 5,846,063 A | 12/1998 | Lakic |
| 5,894,683 A | 4/1999 | Lin |
| 5,902,660 A | 5/1999 | Huang |
| 5,930,918 A | 8/1999 | Healy et al. |
| 5,937,462 A | 8/1999 | Huang |
| 5,950,332 A | 9/1999 | Lain |
| 5,976,451 A | 11/1999 | Skaja et al. |
| 5,979,078 A | 11/1999 | McLaughlin ............... 36/29 |
| 5,996,052 A | 11/1999 | Taniguchi et al. |
| 5,996,250 A | 12/1999 | Reed et al. |
| 6,085,444 A | 7/2000 | Cho |
| 6,128,837 A | 10/2000 | Huang |
| 6,161,240 A | 12/2000 | Huang |
| 6,192,606 B1 | 2/2001 | Pavone |
| 6,247,248 B1 | 6/2001 | Clark |
| 6,428,865 B1 | 8/2002 | Huang |
| 6,457,262 B1 | 10/2002 | Swigart |
| 6,460,197 B2 | 10/2002 | Huang |
| 6,510,624 B1 | 1/2003 | Lakic |
| 6,553,691 B2 | 4/2003 | Huang |
| 2001/0042321 A1 | 11/2001 | Tawney et al. ............... 36/29 |
| 2002/0035794 A1 | 3/2002 | Doyle |
| 2002/0053146 A1 | 5/2002 | Swigart |
| 2002/0056979 A1 | 5/2002 | Baker |
| 2002/0194747 A1 | 12/2002 | Passke et al. |
| 2003/0084593 A1 | 5/2003 | Lakic |

FOREIGN PATENT DOCUMENTS

| | | |
|---|---|---|
| DE | 3635156 | 4/1987 |
| FR | 2 614 510 | 11/1988 |
| FR | 2 607 369 | 6/1992 |
| GB | 2206475 | 1/1989 |
| JP | 2-41104 | 7/1988 |
| WO | WO 98/57560 | 12/1998 |

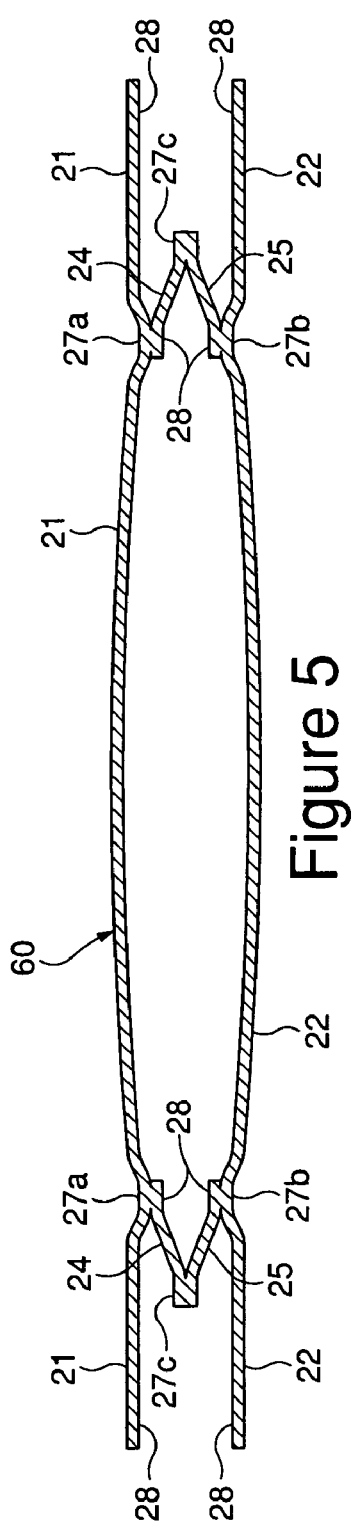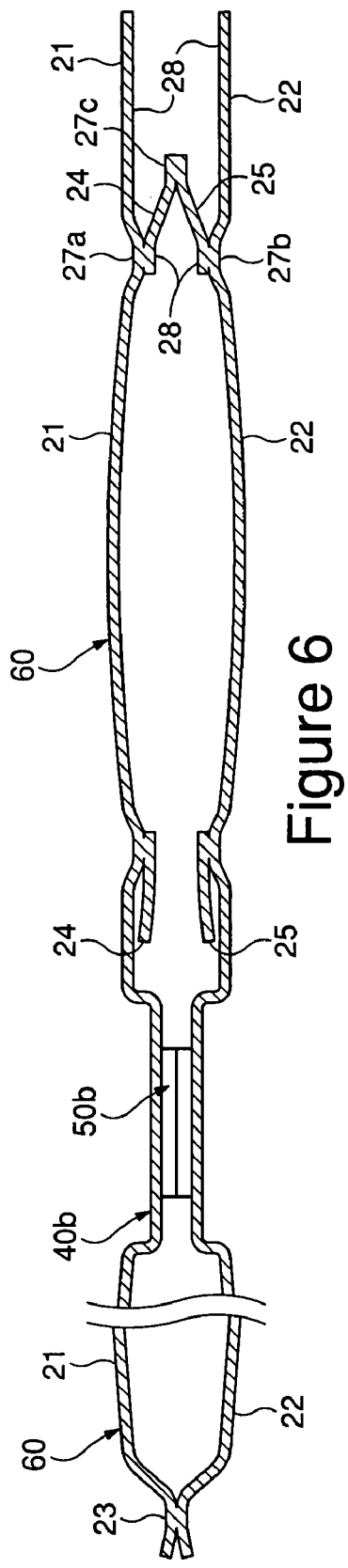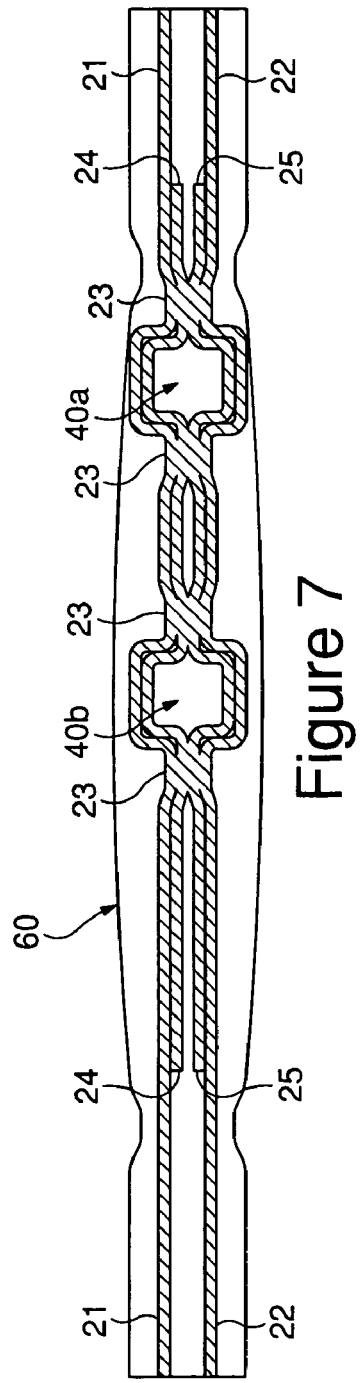

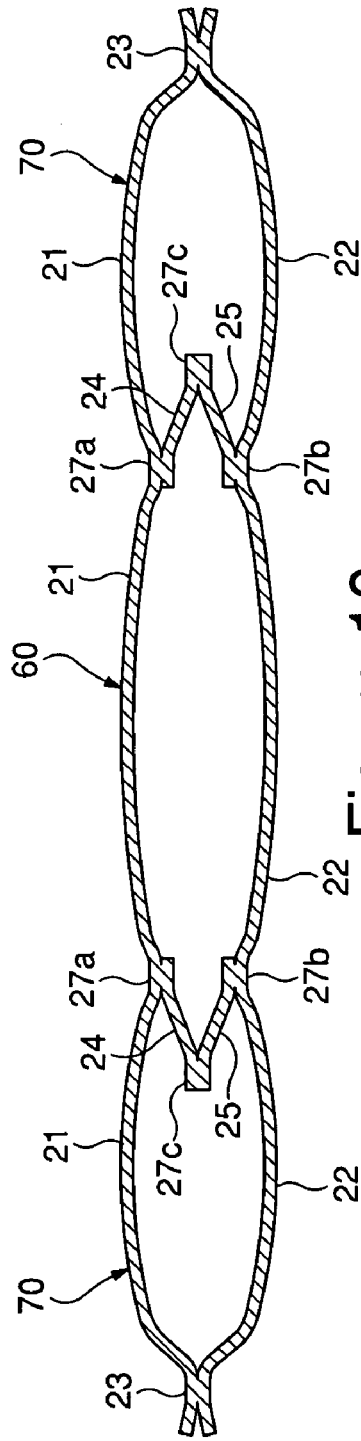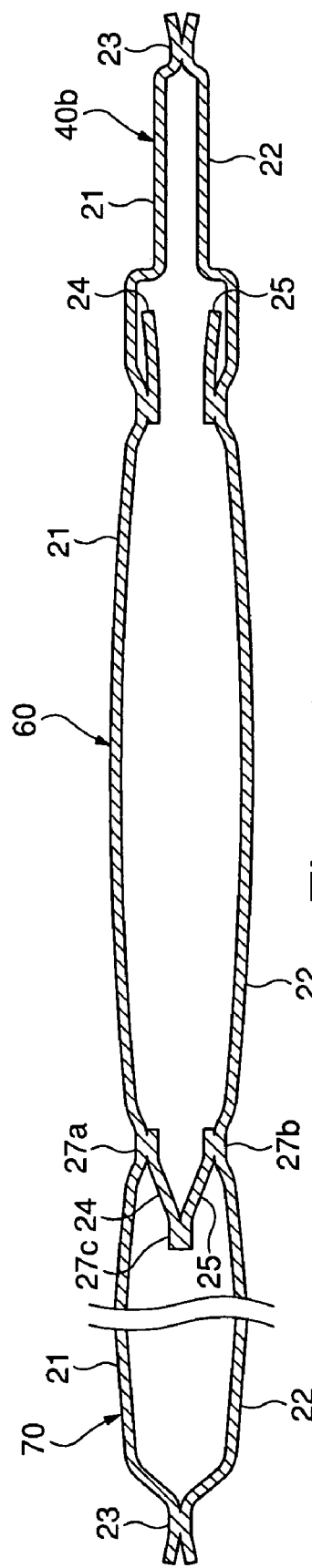

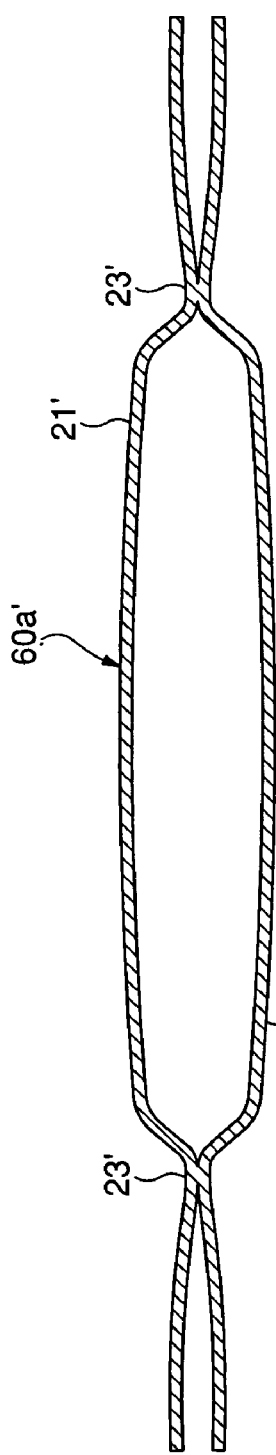
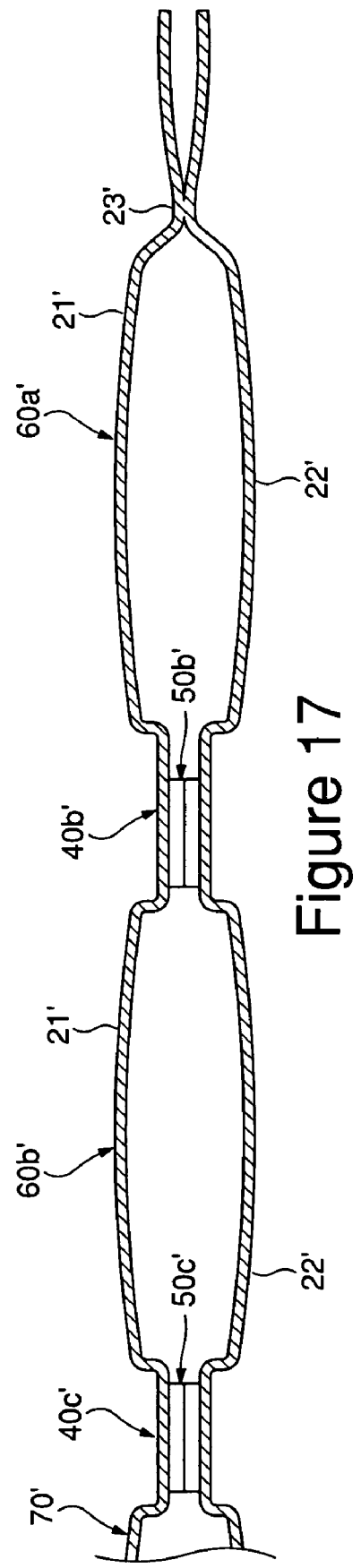

FLUID SYSTEM HAVING AN EXPANDABLE PUMP CHAMBER

BACKGROUND OF THE INVENTION

Conventional articles of athletic footwear include two primary elements, an upper and a sole structure. The upper is usually formed from a plurality of elements, such as textiles, foam, and leather materials, that are stitched or adhesively bonded together to form an interior void for securely and comfortably receiving a foot. The sole structure incorporates multiple layers that are conventionally referred to as an insole, a midsole, and an outsole. The insole is a thin, compressible member located within the upper and adjacent a sole of the foot to enhance comfort. The midsole is secured to the upper and forms a middle layer of the sole structure. The outsole forms a ground-contacting element of the footwear and is usually fashioned from a durable, wear resistant material that includes texturing to improve traction.

The primary material forming a conventional midsole is a resilient, polymer foam, such as polyurethane or ethylvinylacetate, that extends throughout a length of the footwear. A polymer foam midsole may also incorporate a fluid-filled chamber, having the configuration of a bladder, to enhance ground reaction force attenuation of the sole structure. U.S. Pat. No. 4,183,156 to Rudy provides an example of a fluid-filled chamber that includes an outer enclosing member formed of an elastomeric material. The outer enclosing material defines a plurality of tubular members in fluid communication with each other.

The fluid-filled chamber described above may be manufactured by a two-film technique, wherein two separate layers of elastomeric film are formed to have the overall shape of the chamber. The layers are then bonded together along their respective peripheries to form an upper surface, a lower surface, and sidewalls of the chamber, and the layers are bonded together at predetermined interior locations to impart a desired shape to the chamber. That is, interior portions of the layers are connected to form subchambers of a predetermined shape and size at desired locations. The chamber is subsequently pressurized above ambient pressure by inserting a nozzle or needle, which is connected to a fluid pressure source, into a fill inlet formed in the chamber. After the chamber is pressurized, the nozzle is removed and the fill inlet is sealed.

Another method of manufacturing a fluid-filled chamber is through a blow-molding process, as generally disclosed in U.S. Pat. No. 5,353,459 to Potter et al., wherein a liquefied elastomeric material is placed in a mold having the desired overall shape and configuration of the bladder. The mold has an opening at one location through which pressurized air is provided. The pressurized air forces the liquefied elastomeric material against the inner surfaces of the mold and causes the material to harden in the mold, thereby forming a chamber with the desired shape and configuration. In addition, fluid-filled chambers may be manufactured through a thermoforming process, as disclosed in U.S. Pat. No. 5,976,451 to Skaja, et al., wherein a pair of sheets of flexible thermoplastic resin are placed against a pair of molds having a vacuum system for properly shaping the two sheets. The mold portions are then closed to seal the two sheets around their peripheries and form the bladder.

An article of footwear may also incorporate a fluid system that includes various components, including a pressure chamber, a pump chamber for increasing the pressure in the pressure chamber, one or more valves for regulating the direction and rate of fluid flow, and conduits that connect the various fluid system components. U.S. Pat. No. 6,457,262 to Swigart discloses a fluid system having a central chamber and two side chambers positioned adjacent central chamber. Each of the side chambers are in fluid communication with the central chamber through at least one conduit that includes a valve. Accordingly, a fluid contained by the fluid system may flow from the central chamber to side chambers, and the fluid may flow from the side chambers to the central chamber. Examples of other fluid systems that are sealed to prevent the entry or exit of ambient air are disclosed in U.S. Pat. No. 5,950,332 to Lain; U.S. Pat. No. 5,794,361 to Sadler; and U.S. Pat. No. 4,446,634 to Johnson et al., for example.

Fluid systems incorporated into an article of footwear may also utilize ambient air as the system fluid. U.S. Pat. No. 5,826,349 to Goss discloses an article of footwear having a fluid system that utilizes ambient air to ventilate an interior of an upper. The fluid system includes an intake positioned on the upper and a conduit leading from the intake to a plurality of chambers that are in fluid communication. Valves associated with the chambers prevent the air from escaping through the intake when the chambers are compressed. Rather, the air is forced out of the chambers through another conduit that leads to the interior of the upper. U.S. Pat. No. 5,937,462 to Huang disclose a fluid system that utilizes ambient air to pressurize a chamber within a sole structure of an article of footwear.

SUMMARY OF THE INVENTION

One aspect of the invention involves a fluid system having a pump chamber and a pressure chamber that are in fluid communication. The pump chamber includes a first pair of layers and a second pair of layers. The first pair of layers form opposite surfaces of the pump chamber, and the second pair of layers are positioned between the first pair of layers and extend at least partially around the pump chamber. The first pair of layers are secured to the second pair of layers to define at least two first bonds, and the second pair of layers are secured to each other to define a second bond that is offset from the first bonds, the layers and bonds form a zigzag-shaped or W-shaped structure in the pump chamber.

Another aspect of the invention involves a method of manufacturing a chamber for a fluid system. The method includes a step of providing a first layer, a second layer, a third layer, and a fourth layer formed from a polymer material. Apertures are defined in each of the second layer and the third layer. The second layer and the third layer are positioned between the first layer and the fourth layer. In addition, the first layer is bonded to the second layer, the second layer is bonded to the third layer, and the third Yet another aspect of the invention involves a fluid system having a first pump chamber and a second pump chamber with a compressible structure. A first fluid path extends between the first pump chamber and the second pump chamber to place the first pump chamber and the second pump chamber in fluid communication. The fluid system also includes a pressure chamber, and a second fluid path extends between the second pump chamber and the pressure chamber to place the second pump chamber and the pressure chamber in fluid communication.

A further aspect of the invention involves a method of manufacturing a fluid system. The method includes a step of forming bonds between a first polymer layer and a second polymer layer to define at least a portion of a first pump chamber, a second pump chamber, and a pressure chamber. A first fluid path and a second fluid path are defined. The first fluid path extends between the first pump chamber and the second pump chamber, and the second fluid path extends between the second pump chamber and the pressure chamber.

The advantages and features of novelty characterizing aspects of the invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

FIG. 5 is a first cross-sectional view of the first fluid system, as defined by section line 5-5 in FIG. 4.

FIG. 6 is a second cross-sectional view of the first fluid system, as defined by section line 6-6 in FIG. 4.

FIG. 7 is a third cross-sectional view of the first fluid system, as defined by section line 7-7 in FIG. 4.

FIG. 10 is a first cross-sectional view of the second fluid system, as defined by section line 10-10 in FIG. 9.

FIG. 11 is a second cross-sectional view of the second fluid system, as defined by section line 11-11 in FIG. 9.

FIG. 16 is a first cross-sectional view of the third fluid system, as defined by section line 16-16 in FIG. 15.

FIG. 17 is a second cross-sectional view of the third fluid system, as defined by section line 17-17 in FIG. 15.

DETAILED DESCRIPTION OF THE INVENTION

Introduction

The following discussion and accompanying figures disclose fluid systems in accordance with aspects of the present invention. Concepts related to the fluid systems are disclosed with reference to an article of athletic footwear having a configuration suitable for the sport of running. The fluid systems are not solely limited to footwear designed for running, however, and may be incorporated into a wide range of athletic footwear styles, including basketball shoes, cross-training shoes, walking shoes, tennis shoes, soccer shoes, and hiking boots, for example. In addition, the fluid systems may be incorporated into footwear that is generally considered to be non-athletic, including dress shoes, loafers, sandals, and work boots. An individual skilled in the relevant art will appreciate, therefore, that the concepts disclosed herein with regard to the fluid systems apply to a wide variety of footwear styles, in addition to the specific style discussed in the following material and depicted in the accompanying figures. In addition to footwear, concepts related to the fluid systems may be incorporated into a variety of other products. Accordingly, aspects of the present invention have application in various technical areas, in addition to footwear.

Expandable Pump Chamber

Figure 1:
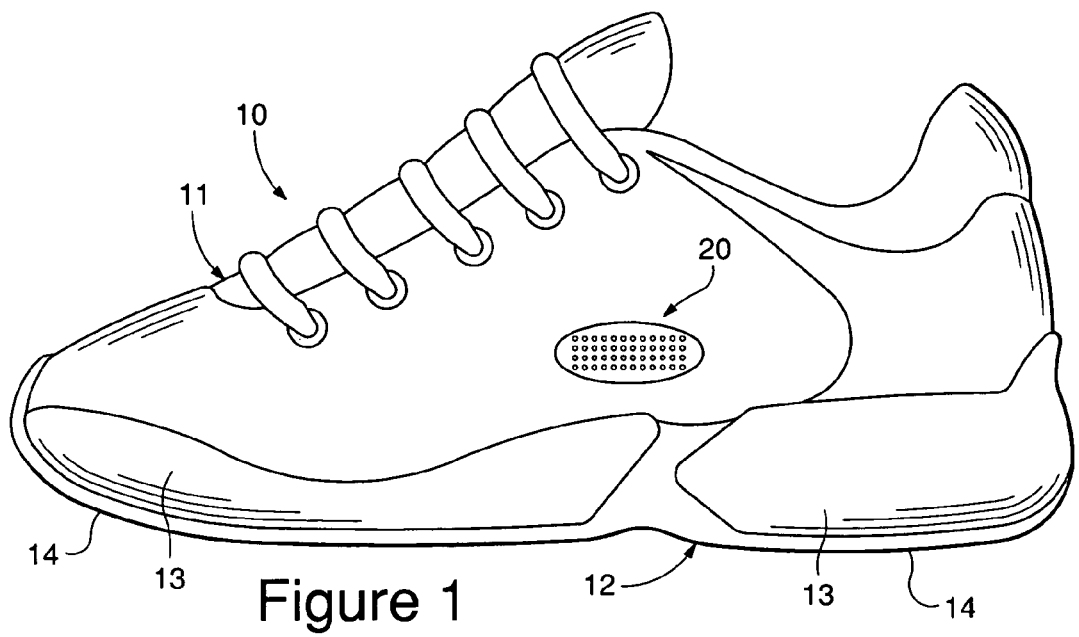
FIG. 1 is a lateral side elevational view of an article of footwear incorporating an exemplar first fluid system with aspects of the invention.

An article of footwear 10 is depicted in FIG. 1 and includes an upper 11 and a sole structure 12. Upper 11 has a substantially conventional configuration formed of a plurality elements, such as textiles, foam, and leather materials, that are stitched or adhesively bonded together to form an interior void for securely and comfortably receiving a foot. Sole structure 12 is positioned below upper 11 and includes two primary elements, a midsole 13 and an outsole 14. Midsole 13 is secured to a lower surface of upper 11, through stitching or adhesive bonding, for example, and operates to attenuate ground reaction forces as sole structure 12 contacts the ground, as during walking or running. Outsole 14 is secured to a lower surface of midsole 13 and is formed of a durable, wear-resistant material that engages the ground. In addition, sole structure 12 may include an insole 15, which is located within the void in upper 11 and adjacent to the foot to enhance the comfort of article of footwear 10.

Figure 2:
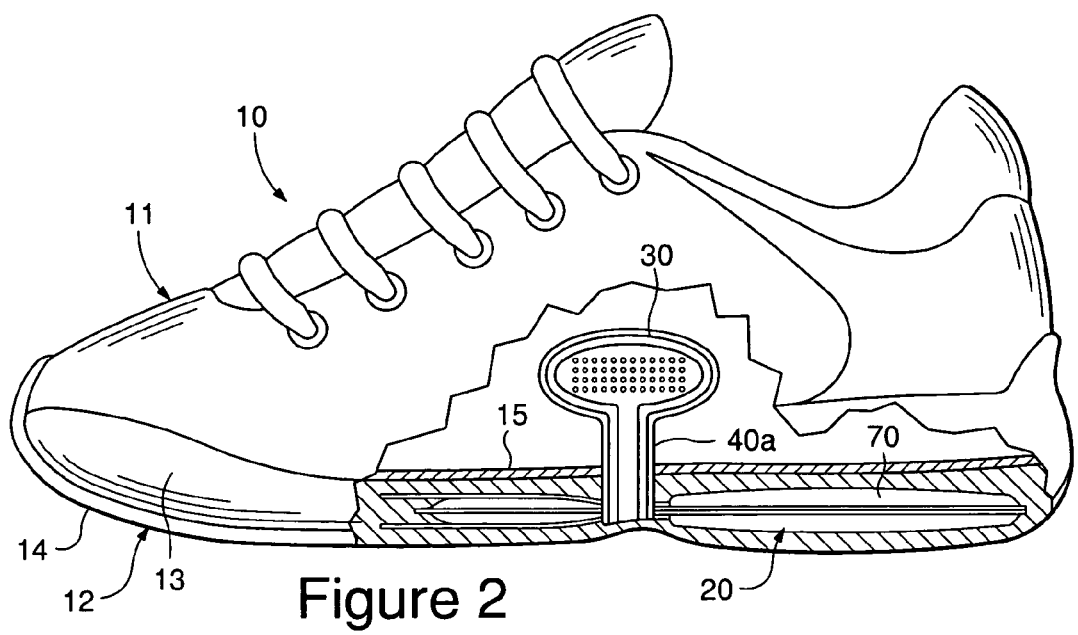
FIG. 2 is a partial cut-away view of the footwear depicting the first fluid system.

Midsole 13 is primarily formed of a polymer foam material, such as polyurethane or ethylvinylacetate, that at least partially encapsulates a fluid system 20. As depicted in FIG. 2, fluid system 20 is primarily positioned in a heel region and a midfoot region of midsole 13, but may be positioned in any region of midsole 13 to impart a desired degree of force attenuation or stability, for example. Furthermore, midsole 13 may incorporate multiple fluid systems 20, with a first fluid system 20 being positioned in the heel region and a second fluid system 20 being positioned in a forefoot region of midsole 13, for example. Fluid system 20 may also have a configuration that extends from the heel region to the forefoot region of midsole 13, thereby extending through a substantial portion of midsole 13.

Fluid system 20 is depicted individually in FIGS. 3-8 and provides a structure that utilizes ambient air to impart additional force attenuation, for example, as sole structure 12 contacts the ground. In addition, fluid system 20 may impart stability, improve responsiveness, and enhance the ride characteristics of midsole 13. The primary elements of fluid system 20 are a filter assembly 30, a pair of conduits 40a and 40b, a pair of valves 50a and 50b that are positioned within conduits 40a and 40b, respectively, a pump chamber 60, and a pressure chamber 70. In operation, a fluid, such as ambient air, is drawn into conduit 40a by passing through filter assembly 30. The fluid then passes through valve 50a and into pump chamber 60. As pump chamber 60 is compressed, the fluid enters conduit 40b and passes through valve 50b to enter pressure chamber 70. A combination of the fluid within pump chamber 60 and pressure chamber 70 imparts the ground reaction force attenuation, for example, that is provided by fluid system 20. In some embodiments, however, a majority of the ground reaction force attenuation provided by fluid system 20 may be imparted by pressure chamber 70.

A pair of polymer layers 21 and 22 are bonded together at specific bonding locations 23 to define portions of filter assembly 30, conduits 40a and 40b, and pressure chamber 70. That is, filter assembly 30, conduits 40a and 40b, and pressure chamber 70 are formed between unbonded positions of layers 21 and 22. Pump chamber 60 is also formed between unbonded positions of layers 21 and 22. As will be described in greater detail below, however, a portion of pump chamber 60 is also formed from a pair of layers 24 and 25. The position of conduit 40a with respect to layers 21 and 22 is selected to provide a fluid path that extends between a fluid source, such as ambient air, and pump chamber 60, thereby permitting the fluid to flow from filter assembly 30 to pump chamber 60. Similarly, the position of conduit 40b is selected to provide a fluid path that extends between pump chamber 60 and pressure chamber 70, which permits the fluid to also flow from pump chamber 60 to pressure chamber 70. In this configuration, therefore, the fluid may flow between layers 21 and 22 to pass through conduits 40a and 40b.

A variety of materials are suitable for layers 21 and 22, including barrier materials that are substantially impermeable to the fluid within fluid system 20. Such barrier materials may include, for example, alternating layers of thermoplastic polyurethane and ethylene-vinyl alcohol copolymer, as disclosed in U.S. Pat. Nos. 5,713,141 and 5,952,065 to Mitchell et al. A variation upon this material wherein the center layer is formed of ethylene-vinyl alcohol copolymer, the two layers adjacent to the center layer are formed of thermoplastic polyurethane, and the outer layers are formed of a regrind material of thermoplastic polyurethane and ethylene-vinyl alcohol copolymer may also be utilized. Another suitable material is a flexible microlayer material that includes alternating layers of a gas barrier material and an elastomeric material, as disclosed in U.S. Pat. Nos. 6,082,025 and 6,127,026 to Bonk et al.

Although polymer layers 21 and 22 may be formed of the barrier materials discussed above, more economical thermoplastic elastomer materials that are at least partially impermeable to the fluid within fluid system 20 may also be utilized. As discussed above, fluid system 20 operates to draw fluid, such as air, into pump chamber 60 and pressure chamber 70 in order to provide ground reaction force attenuation to article of footwear 10. If a portion of the fluid within pump chamber 60 or pressure chamber 70 should escape from fluid system 20 by diffusing or otherwise passing through polymer layers 21 and 22, then fluid system 20 will operate to draw additional fluid into pump chamber 60 and pressure chamber 70, thereby replenishing the escaped fluid. Accordingly, polymer layers 21 and 22 need not provide a barrier that is substantially impermeable to the fluid within fluid system 20, but may be at least partially impermeable to the fluid within fluid system 20. Suitable polymer materials include, therefore, thermoplastic elastomers such as polyurethane, polyester, polyester polyurethane, and polyether polyurethane. In addition to decreased manufacturing costs, a benefit of utilizing these thermoplastic elastomers is that the specific material forming layers 21 and 22 may be selected based primarily upon the engineering properties of the material, rather than the barrier properties of the material. Accordingly, the material forming layers 21 and 22 may be selected to exhibit a specific tensile strength, elastic modulus, durability, degree of light transmission, elasticity, resistance to corrosion or chemical breakdown, or abrasion resistance, for example.

Filter assembly 30 has the general structure of a filter assembly described in U.S. patent application Ser. No. 09/887,523, which was filed Jun. 21, 2001 and is hereby entirely incorporated by reference. Filter assembly 30 is generally positioned on an exterior of article of footwear 10 and includes two primary components, a cover element 31 and a filter material 32. Cover element 31 extends over filter material 32 and includes a plurality of perforations that permit air to access filter material 32, while preventing relatively large objects, such as stones and tree branches, from directly contacting and potentially damaging filter material 32. The fluid is drawn into fluid system 20 through filter material 32, which limits water, other liquids, and a variety of particulates from hindering the operation of various system components, such as valves 50a and 50b and pressure chamber 70. If permitted to enter fluid system 30, particulates, for example, could collect around and within valves 50a and 50b. As will be discussed in greater detail below, valves 50a and 50b are one-directional valves that permit fluid to flow in a first direction, but limit or check fluid flow in an opposite second direction. Particulates that collect around and within valves 50a and 50b may affect the one-directional operation of valves 50a and 50b, thereby permitting the fluid to flow through fluid system 20 in an unintended manner. In the absence of filter assembly 30, water and particulates could also collect within pressure chamber 70. In some embodiments, a portion of pressure chamber 70 may be visible through apertures formed in the polymer foam material of midsole 13. Particulates that collect within pressure chamber 70 could become visible from the exterior of article of footwear 10, thereby decreasing the aesthetic properties of article of footwear 10. If water were also permitted to enter and collect in pump chamber 60, pressure chamber 70, or other portions of fluid system 20, the weight of article of footwear 10 may increase significantly. Furthermore, particulates may act as an abrasive that wears away portions of fluid system 20, thereby decreasing durability. Accordingly, filter assembly 30 acts to limit the entry of liquids and particulates that may have a detrimental effect upon fluid system 20.

One suitable material for filter material 32 is polytetrafluoroethylene (PTFE), which may be deposited on a substrate material. PTFE exhibits the required characteristics and is suitably durable when attached to a substrate such as nonwoven polyester. A variation upon the standard formulation of PTFE is expanded polytetrafluoroethylene (ePTFE) which is manufactured by, for example, W. L. Gore & Associates. In addition to PTFE, other suitable materials for filter material 32 include high density polyethylene, ultrahigh molecular weight polyethylene, polyvinylidene fluoride, polypropylene, and certain ceramic filter materials. Knit materials, woven materials, nonwoven materials, laminate structures consisting of one or more differing filter materials, and paper may also be suitable. In addition, filter material 32 may be formed of a solid, porous material.

Valves 50a and 50b may be any type of valve that performs in accordance with the design requirements of system 20.

Valves structures that may be utilized for valves 50a and 50b include, for example, duckbill valves manufactured by Vernay Laboratories, Inc. and the two-layer polymer valves disclosed in U.S. Pat. Nos. 5,144,708 to Pekar and U.S. Pat. No. 5,564,143 to Pekar et al. Both types of valves are generally considered one-directional valves that permit fluid flow in a first direction, but limit fluid flow in an opposite second direction. With respect to fluid system 20, valve 50a permits fluid flow in the direction from filter assembly 30 to pump chamber 60, and valve 50b permits fluid flow in the direction from pump chamber 60 to pressure chamber 70. Valves 50a and 50b, however limit fluid flow in opposite directions. Depending upon the specific characteristics that a fluid system is intended to impart, valves that permit fluid flow in both directions may also be utilized within the scope of the present invention. In addition to the valve structures disclosed above, valves 50a and 50b may also have the configuration of a valve 100, which is described with reference to FIGS. 22A-22G following a more detailed discussion regarding the operation of fluid system 20.

Figure 3:
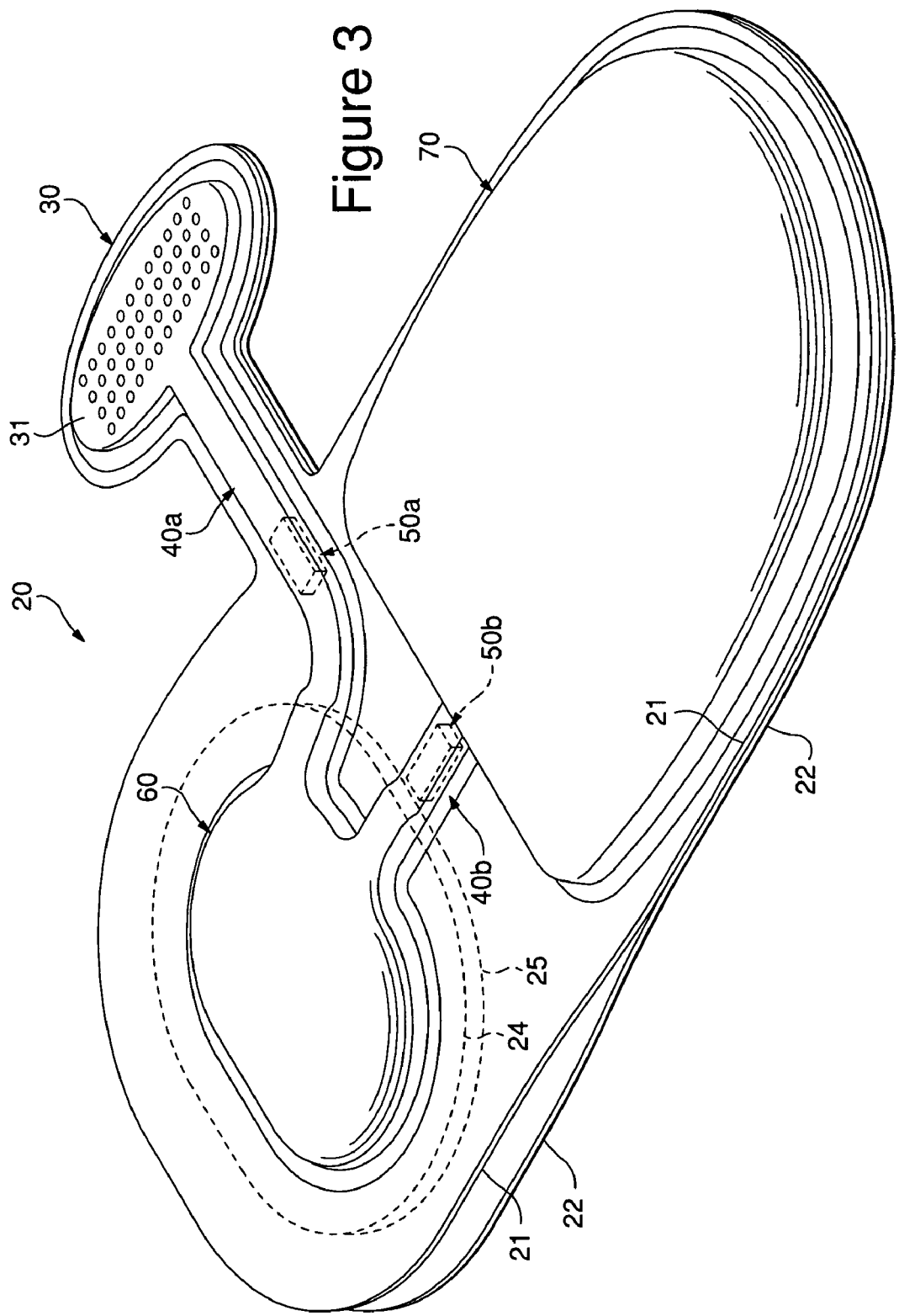
FIG. 3 is a perspective view of the first fluid system.
Figure 4:
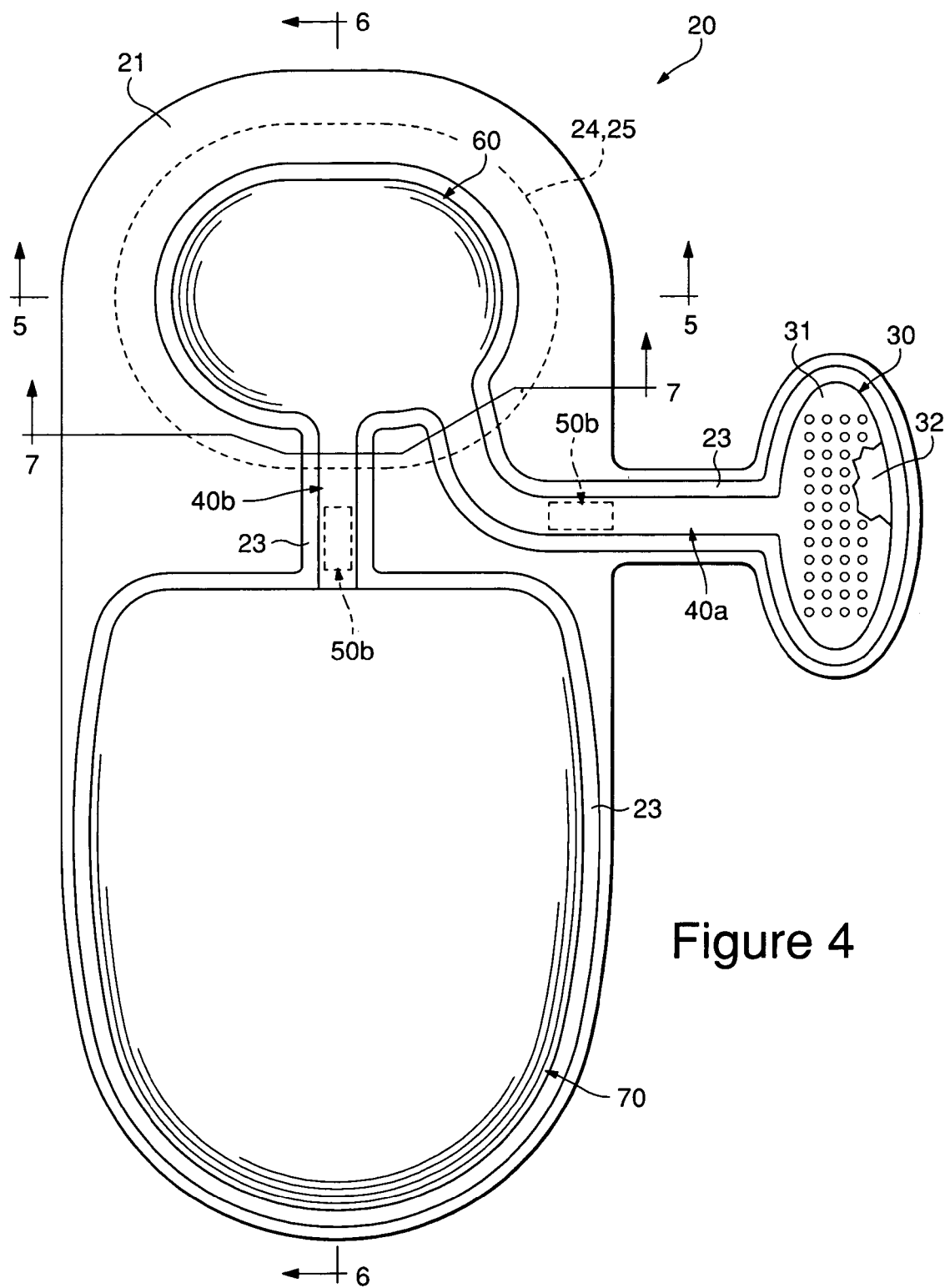
FIG. 4 is a top plan view of the first fluid system.

Fluid system 20 is configured to provide an air inlet that is separate from pump chamber 60. With reference to FIGS. 3 and 4, fluid system 20 is depicted as having an air inlet at filter assembly 30, and conduit 40a extends between filter assembly 30 and pump chamber 60. Accordingly, air is introduced into fluid system 20 through an air inlet that is separate from pump chamber 60. The separate air inlet and pump chamber 60 permits the air inlet to be located on any portion of footwear 10, including upper 11, and this configuration permits the air inlet to include a filter material 32 that is not positioned in an area of repetitive compressive forces.

Another feature of fluid system 20 is the direct fluid communication between pump chamber 60 and pressure chamber 70. Conduit 40b leads directly from pump chamber 60 to pressure chamber 70 and provides an area for positioning valve 50b. Accordingly, a minimum number of fluid system components are placed in the fluid path between pump chamber 60 and pressure chamber 70. This configuration reduces the pressure losses that arise through transfer of the fluid from pump chamber 60 to pressure chamber 70. Furthermore, this configuration provides a fluid system with a relatively small number of components.

The operation of fluid system 20 will now be discussed in detail. The pressure of the fluid within the various components of fluid system 20 changes depending upon the manner in which article of footwear 10 is utilized, the frequency at which sole structure 12 is compressed, and the force that compresses sole structure 12, for example. For purposes of the present discussion, the operation of fluid system 20, and the pressure of the fluid within the various components of fluid system 20 will be discussed with regard to an initial state, a transition state, and an equilibrium state. During the initial state, pump chamber 60 and pressure chamber 70 contain a fluid with an initial pressure that is substantially equal to the ambient pressure of air that surrounds article of footwear 10 and fluid system 20. During the transition state, the pressure within pressure chamber 70 increases from the initial pressure to an equilibrium pressure, at which time fluid system 20 is in the equilibrium state.

Fluid system 20 is at least partially encapsulated within the polymer foam material of midsole 13. In manufacturing article of footwear 10, fluid system 20 may be positioned within a mold having the shape of midsole 13. When fluid system 20 is placed within the mold, fluid system 20 is either in the initial state or the pressure of the fluid within pump chamber 60 and pressure chamber 70 is slightly elevated above the ambient pressure. Accordingly, pump chamber 60 and pressure chamber 70 are in an expanded configuration rather than a collapsed configuration. That is, the fluid places sufficient outward pressure upon layers 21 and 22 to prevent pump chamber 60 and pressure chamber 70 from significantly collapsing. The polymer foam material of midsole 13 is then injected into the mold and around fluid system 20. Upon curing of the polymer foam material, fluid system 20 is securely encapsulated within midsole 13 such that pump chamber 60 and pressure chamber 70 remain in the expanded configuration. Furthermore, the polymer foam material may bond to the exterior surfaces of layers 21 and 22. Midsole 13 is then secured to upper 11 and outsole 14 to form article of footwear 10.

During the manufacturing process of article of footwear 10, the pressure of the fluid within pump chamber 60 and pressure chamber 70 may be slightly elevated above the ambient pressure, as discussed above. As article of footwear 10 is shipped to retailers or stored, the fluid within fluid system 20 may diffuse through layers 21 and 22 or otherwise escape from fluid system 20 until the pressure of the fluid is substantially equal to the ambient pressure of air that surrounds article of footwear 10 and fluid system 20. Accordingly, when an individual first places article of footwear 10 upon the foot, fluid system 20 is in the initial state.

Fluid system 20 may be positioned in the heel region of midsole 13, as depicted in FIG. 2. More particularly, fluid system 20 may be positioned such that pressure chamber 70 is positioned directly below the calcaneus bone of the individual wearing article of footwear 10, and pump chamber 60 is positioned forward of pressure chamber 70. When the individual takes a first step in article of footwear 10, sole structure 12 is compressed against the ground, which compresses both midsole 13 and fluid system 20. Based upon the relative positions of the calcaneus bone, pump chamber 60, and pressure chamber 70, pressure chamber 70 bears a large portion of the force that causes the compression. As the foot rolls forward, however, the pressure upon pump chamber 60 increases. The compression of pump chamber 60 causes the pressure of the fluid within pump chamber 60 to increase. When a pressure differential between pump chamber 60 and pressure chamber 70 exceeds various pressure losses inherent in fluid system 20, a portion of the fluid within pump chamber 60 passes through conduit 40b and through valve 50b to pass into pressure chamber 70. That is, compressing pump chamber 60 may cause a portion of the fluid within pump chamber 60 to pass into pressure chamber 70. This additional fluid within pressure chamber 70 causes the pressure within pressure chamber 70 to increase. As the individual takes a first step, therefore, fluid system 20 is placed in the transition state due to increases in pressure of both pump chamber 60 and pressure chamber 70. The various pressure losses mentioned above may be associated with friction that occurs as the fluid passes through conduit 40b and an opening pressure of valve 50b.

Valves 50a and 50b are one-directional valves that permit fluid flow in a first direction, but limit or check fluid flow in an opposite second direction. Valve 50a permits fluid to flow from filter assembly 30 to pump chamber 60, but limits fluid flow in the opposite direction. When pump chamber 60 is compressed, therefore, valve 50a effectively prevents the fluid from flowing to filter assembly 30. Valve 50b, however, permits fluid to flow from pump chamber 60 to pressure chamber 70 when the pressure differential between pump chamber 60 and pressure chamber 70 exceeds the pressure losses discussed above.

As the first step of the individual progresses, and the foot no longer places a significant force upon midsole 13, the compressive force exerted upon fluid system 20 decreases and midsole 13 returns to an uncompressed configuration. The pressure of the fluid within pressure chamber 70, however, remains elevated and fluid system 20 remains in the transition state. Due to the bonds between the polymer material of midsole 13 and layers 21 and 22, midsole 13 will place an outward force on pump chamber 60 as midsole 13 returns to the uncompressed configuration. That is, the polymer material of midsole 13 may attempt to expand the compressed pump chamber 60. This action causes the pressure within pump chamber 60 to become negative relative to the ambient pressure of the air outside of article of footwear 10 and fluid system 20. Accordingly, a negative pressure differential is formed between pump chamber 60 and the ambient air. Filter assembly 30 and conduit 40a form a fluid path between the ambient air and pump chamber 60. When the negative pressure differential exceeds various pressure losses associated with fluid system 20, ambient air will pass through filter assembly 30, enter conduit 40a, pass through valve 50a, and enter pump chamber 60, thereby placing additional fluid within pump chamber 60. In other words, air will flow into pump chamber 60 as midsole 13 expands from being compressed. The various pressure losses mentioned above may be associated with resistance from filter material 32, friction that occurs as the fluid passes through conduit 40a, and an opening pressure of valve 50a.

The discussion above details the manner in which a first step of the individual compresses pump chamber 60 and causes a portion of the fluid within pump chamber 60 to pass into pressure chamber 70, thereby increasing the pressure within pressure chamber 70. Once the first step is completed and midsole 13 is not being compressed, additional air passes into pump chamber 60 from the ambient air that surrounds article of footwear 10 and fluid system 20. When the individual takes a second step and a plurality of further steps, the process described with respect to the first step repeats and the pressure of the fluid within pressure chamber 70 increases. Accordingly, fluid system 20 remains in the transition stage as the pressure within pressure chamber 70 rises.

Immediately prior to the first step, the pressure within pump chamber 60 and pressure chamber 70 was substantially equal to the ambient pressure of air. As midsole 13 was compressed, therefore, pump chamber 60 and pressure chamber 70 provided a relatively small degree of support. That is, the pressure of the fluid within pump chamber 60 and pressure chamber 70 was not sufficient to provide a relatively large degree of ground reaction force attenuation. As the individual continues to take steps and the pressure of the fluid within pressure chamber 70 increases, however, the degree of support and ground reaction force attenuation provided by pressure chamber 70 also increases. After a sufficient number of steps, the pressure within pressure chamber 70 becomes substantially equal to the pressure of pump chamber 60 when compressed by the foot. When this occurs, the pressure differential between pump chamber 60 and pressure chamber 70 becomes insufficient to induce further fluid transfer between pump chamber 60 and pressure chamber 70. Accordingly, the pressure of the fluid within pressure chamber 70 will eventually balance the compression of pump chamber 60, and fluid system 20 will reach the equilibrium state.

The volume of fluid that is transferred from pump chamber 60 to pressure chamber 70 during each step of the individual is at least partially dependent upon the volume of pump chamber 60. More particularly, an increase in the volume of pump chamber 60 will generally result in a greater volume of fluid entering pressure chamber 70, thereby decreasing the total time in which fluid system 20 remains in the transition stage. One manner of increasing the volume of pump chamber 60 involves increasing the width and length of pump chamber 60. Although this may be an effective manner of increasing the volume of pump chamber 60, the area of midsole 13 is limited and other components of fluid system 20 (i.e., conduits 40a and 40b, and pressure chamber 60) must fit within this area. Another manner of increasing the volume of pump chamber 60 involves increasing the vertical thickness (i.e., distance between layers 21 and 22) of pump chamber 60.

Fluid system 20 may be formed through a process that involves heating layers 21 and 22 and utilizing a mold to bond layers 21 and 22 together at bonding locations 23. In the absence of layers 24 and 25, increasing the vertical thickness of pump chamber 60 may involve stretching layers 21 and 22 while located within the mold. When stretched, a thickness of layers 21 and 22 decreases, which may decrease the durability of pump chamber 60 or increase the degree to which fluid diffuses through layers 21 and 22 at pump chamber 60. In order to limit the degree to which layers 21 and 22 stretch, while increasing the volume of pump chamber 60, layers 24 and 25 are utilized to form at least a portion of pump chamber 60.

Figure 8:
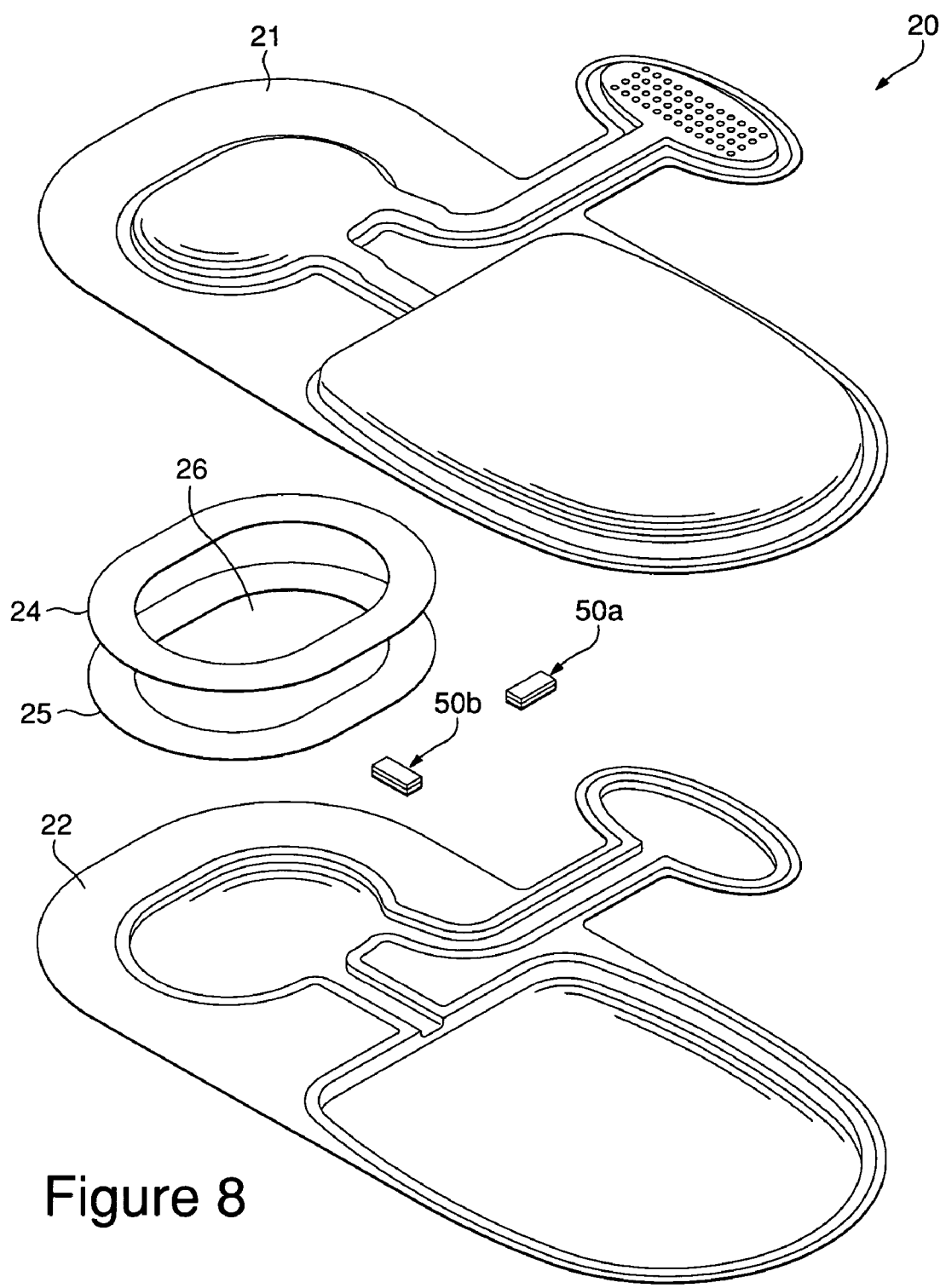
FIG. 8 is an exploded perspective view of the first fluid system.

Layers 24 and 25 extend at least partially around pump chamber 60 and form at least a portion of a sidewall of pump chamber 60. Each of layers 24 and 25 define an aperture 26, as depicted in FIG. 8. In forming pump chamber 60, layer 24 is bonded to layer 21 at a first bonding location 27a, layer 25 is bonded to layer 22 at a second bonding location 27b, and layers 24 and 25 are bonded to each other at a third bonding location 27c that is adjacent to the edges that define apertures 26. More particularly, bonding locations 27a and 27b are depicted as being aligned through the thickness of pump chamber 20, and bonding location 27c is depicted as being located adjacent aperture 26 and in a position that is offset from bonding locations 27a and 27b. As depicted in FIGS. 5 and 6, this configuration forms a zigzag or W-shaped structure in the sidewalls of pump chamber 60. In further aspects of the invention, the bonds formed at bonding locations 27a-27c may exhibit different configurations. For example, bonding location 27c may be spaced inward from the edges that defines apertures 26. Similarly, bonding locations 27a and 27b may be adjacent to or spaced inward from an outer edge of layers 24 and 25.

The zigzag or W-shaped structure in the sidewalls of pump chamber 60 facilitates expansion of pump chamber 60. That is, the vertical thickness of pump chamber 60 may increase substantially over a configuration wherein layers 21 and 22 are bonded to each other. In addition, this structure for the sidewalls of pump chamber 60 imparts a self-expanding feature. That is, pump chamber 60 may expand and inflate with fluid without other expansion structures. As discussed above, expansion of the polymer material of midsole 13 may attempt to expand the compressed pump chamber 60. In some configurations, the polymer material of midsole 13 may be insufficient to expand pump chamber 60 and draw fluid into pump chamber 60. The presence of layers 24 and 25, however, imparts a configuration wherein expansion will occur independent of the presence of the polymer material of midsole 13. Furthermore, the presence of layers 24 and 25 decouples the polymer material of midsole 13 from the expansion of pump chamber 60 so that fluid system 20 may be utilized in an environment where no external polymer foam is present.

Some prior art fluid systems are also utilized in environments where no foam or other structures are present on the exterior of the fluid system to cause expansion of a pump. In order to overcome this, the prior art fluid systems may place foam or another expansion structure within the interior volume of the pump. For example, U.S. Pat. No. 5,564,143 to Pekar, et al. discloses a fluid system wherein foam is located between polymer layers forming the pump to enhance expansion. An advantage in the configuration of fluid system 20, and particularly pump chamber 60, is that the effective volume of pump chamber 60 is increased due to the lack of elements within pump chamber 60. Accordingly, forming pump chamber 60 to have the configuration described above has the advantages of maximizing the effective volume of pump chamber 60 while providing a self-expanding structure.

Fluid system 20 is depicted as generally extending along a horizontal plane. Prior to bonding, each of layers 21, 22, 24, and 25 will also extend along the horizontal plane. The formation of bonds at bonding locations 27a-27c induces an incline in layers 24 and 25 that effectively holds layers 21 and 22 away from each other in the absence of outside forces. That is, the incline in layers 24 and 25 provide the self-expanding feature inherent in pump chamber 20.

As noted above, fluid system 20 may be formed through a process that involves heating layers 21 and 22 and utilizing a mold to bond layers 21 and 22 together at bonding locations 23. In addition to bonding layers 21 and 22 at bonding locations 23, layers 24 and 25 are also bonded to form the various bonding locations 27a, 27b, and 27c. Fluid system 20 may be formed, therefore, through a thermoforming process that involves heating layers 21, 22, 24, and 25 and utilizing a mold to bond layers 21, 22, 24, and 25 together in the desired locations. Prior to heating, layers 24 and 25 may be placed between portions of layers 21 and 22 that will become pump chamber 60, and valves 50a and 50b may be placed between portions of layers 21 and 22 that will become conduits 40a and 40b. Similarly, filter material 32 may be placed between portions of layers 21 and 22 that will become filter assembly 30. The mold utilized in the thermoforming process may have areas that compress layers 21 and 22 to form bonding locations 23. Furthermore, the mold may have cavities configured to receive portions of layers 21 and 22 and define the shapes of conduits 40a and 40b, pump chamber 60, and pressure chamber 70. When bonding layers 21 and 22 together, a fluid may be injected between layers 21 and 22 to press layers 21 and 22 into the various contours of the mold. Similarly, a vacuum may be induced on the exterior of layers 21 and 22 to also draw layers 21 and 22 into the various contours of the mold.

Bonding locations 23 are areas of fluid system 20 wherein layers 21 and 22 are bonded to each other. Accordingly, fluid system 20 is effectively formed of two polymer layers at bonding locations 23 and these two polymer layers are bonded through the entire thickness of fluid system 20 at bonding locations 23. In areas of fluid system 20 where layers 24 and 25 are present, bonding occurs between specified layers, but not through the entire thickness of fluid system 20. For example, bonds form at bonding locations 27a and 27b, but not between layers 24 and 25 at these particular locations. In addition, a bond forms at bonding location 27c, but not between layers 21 and 24 and layers 22 and 25 at this particular location. In order to inhibit bonds from forming between specified areas of layers 21, 22, 24, and 25, a blocking material may be utilized. Blocking materials, when located between two polymer layers, provide an effective means by which bonding is inhibited. Accordingly, a blocking material may be applied or positioned adjacent to various surfaces of layers 21, 22, 24, and 25 where bonding would otherwise occur, but not to portions of layers 21, 22, 24, and 25 where bonding is intended to occur. Suitable blocking materials include layers or coatings that incorporate polytetrafluoroethylene, silicone, or mylar, for example.

With reference to FIGS. 5 and 6, the various positions where a blocking material may be applied to inhibit bonding are shown by locations 28. For example, the blocking material may be applied between layers 24 and 25 in an area that corresponds with bonding locations 27a and 27b. The blocking material may be applied to each of the unbonded surfaces of layers 24 and 25, or the blocking material may be applied to only one of the unbonded surfaces of layers 24 and 25. Alternately, the blocking material may be a separate sheet of material that extends between the unbonded surfaces of layers 24 and 25. The blocking material may also be applied between layers 21 and 24 and layers 22 and 25 in areas that correspond with bonding location 27c.

A variety of other processes may be utilized to form fluid system 20, in addition to the thermoforming process described above. For example, layers 21 and 22 may be formed from flat thermoplastic sheets that are bonded together to define conduits 40a and 40b, portions of pump chamber 60, and pressure chamber 70. In addition, layers 21 and 22 may be separately formed to include indentations corresponding with conduits 40a and 40b, portions of pump chamber 60, and pressure chamber 70. Layers 24 and 25 may then be placed between layers 21 and 22, and bonds may be formed to define bonding locations 27a, 27b, and 27c. Furthermore, fluid system 20 or individual components of fluid system 20 may be manufactured through blow molding or rotational molding processes. In situations where individual components of fluid system 20 are formed separately, the individual components may be subsequently joined together to form fluid system 20. That is, a bonding technique may be utilized to join conduits 40a and 40b, pump chamber 60, and pressure chamber 70, as described in U.S. patent application Ser. No. 10/351,876, which was filed Jan. 27, 2003 and is hereby entirely incorporated by reference.

As described above, pump chamber 60 is effectively formed from four layers 21, 22, 24, and 25. In order to further increase the expansion capabilities or volume of pump chamber 60, one or more additional layers that are similar to layers 24 and 25 may be utilized. In locations where conduit 40a enters pump chamber 60, and in locations where conduit 40b exits pump chamber 60, breaks or gaps in bonding location 27c may be formed between layers 24 and 25 to permit fluid flow into and out of pump chamber 60. Accordingly, a blocking material may also be utilized in these areas to inhibit bonding.

Figure 9:
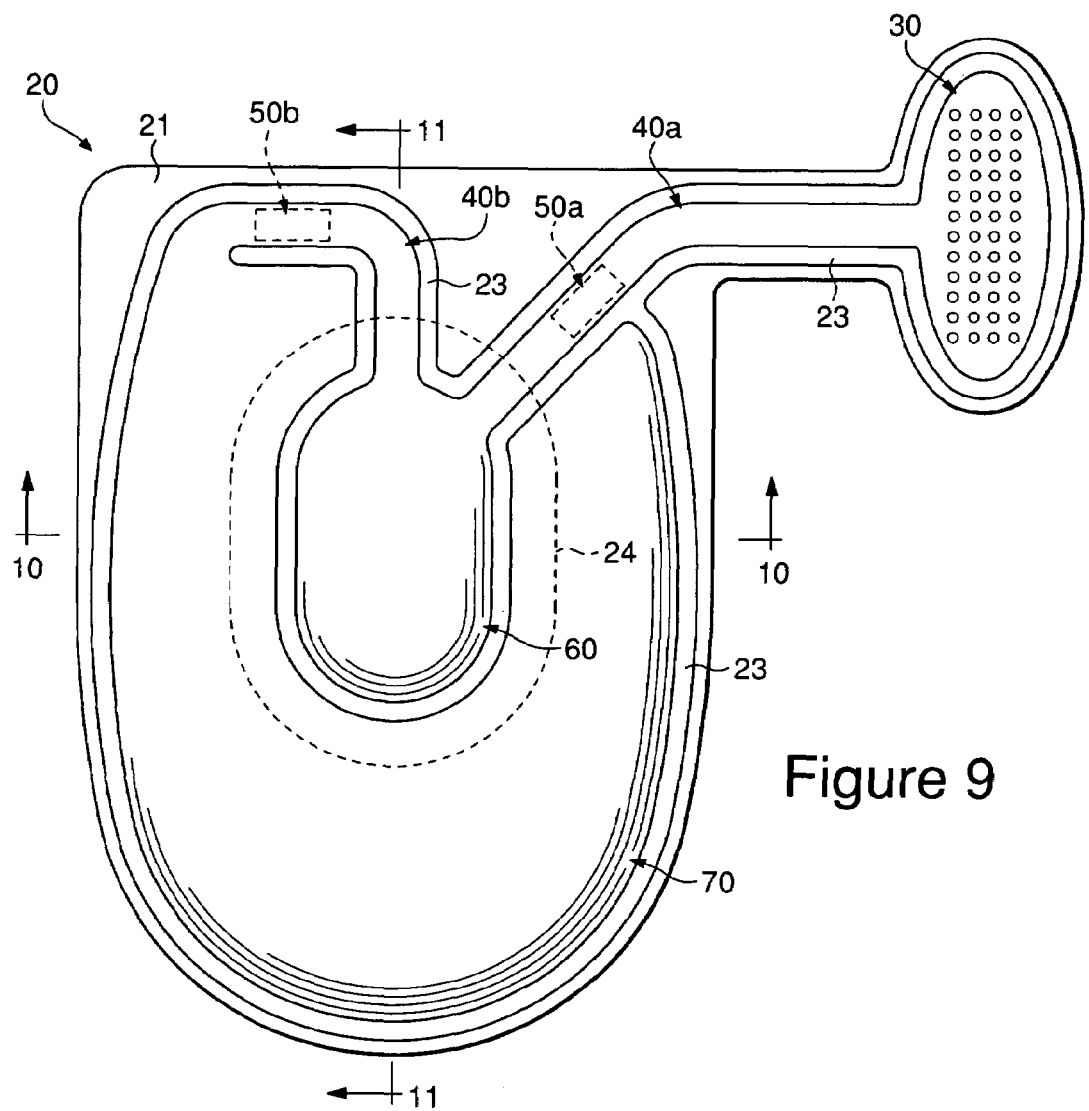
FIG. 9 is a top plan view of an exemplar second fluid system incorporating aspects of the invention.

The arrangement of the various components in fluid system 20 may be modified significantly to accommodate various applications. For example, the lengths of conduits 40a and 40b may be modified such that pump chamber 60 may be positioned in the forefoot region of footwear 10 while pressure chamber 70 remains in the heel region. Alternately, pressure chamber 70 may be positioned in the forefoot region. The relative volumes and shapes of pump chamber 60 and pressure chamber 70 may also vary significantly. As depicted in FIGS. 2-7, fluid system 20 is configured so that pump chamber 60 is separated from pressure chamber 70. With reference to FIGS. 9-11, however, pressure chamber 70 extends around the side portion of pump chamber 60.

The pressure of the fluid within pressure chamber 70 at the equilibrium state is at least partially a function of the degree to which pressure chamber 70 extends around the side portion of pump chamber 60. For purposes of example, assume pump chamber 60 and pressure chamber 70 are sufficiently separated such that increases in pressure within pressure chamber 70 do not provide support against compressions of pump chamber 60. In this configuration, the maximum pressure of pressure chamber 70 is approximately equal to the maximum pressure that the individual may induce within pump chamber 60. When pressure chamber 70 extends around at least a portion of the side portion of pump chamber 60, however, the increase in pressure of the fluid within pressure chamber 70 provides support against compressing pump chamber 60. As the degree to which pressure chamber 70 extends around pump chamber 60 increases, the amount of support that pressure chamber 70 may provide to resist compressions of pump chamber 60 also increases. For example, if pressure chamber 70 extends only partially around the side portion of pump chamber 60, then portions of pump chamber 60 that are not adjacent to pressure chamber 70 may remain compressible. If, however, pressure chamber 70 extends entirely around pump chamber 60, then pressure chamber 70 may substantially limit the amount that pump chamber 60 may be compressed. Accordingly, the pressure of the fluid within pressure chamber 70 is at least partially determined by the degree to which pressure chamber 70 extends around the side portion of pump chamber 60. The pressure of the fluid within pressure chamber 70 is, therefore, effectively limited by extending pressure chamber 70 around at least a portion of pump chamber 60. Accordingly, the degree to which pressure chamber 70 extends around the side portion of pump chamber 60 contributes to a pressure-limiting feature of fluid system 20. Other factors that determine the pressure of the fluid within pressure chamber 70 include the relative forces exerted upon pump chamber 60 and pressure chamber 70, the relative dimensions of pump chamber 60 and pressure chamber 70, and the compressibility of the foam material encapsulating fluid system 20, for example.

Pressure chamber 70, as depicted in FIG. 9, forms a generally C-shaped structure with an interior area that accommodates pump chamber 60. In other embodiments of fluid system 20, however, pressure chamber 70 may extend around the side portion of pump chamber 60 to a lesser or greater degree. Although pressure chamber 70 extends at least partially around pump chamber 60, the sidewalls of pump chamber 60 may still be formed to exhibit the expandable configuration discussed above. That is, layers 24 and 25 may be positioned between layers 21 and 22 to impart an expandable configuration to pump chamber 60. Layers 24 and 25 also form a divider between pump chamber 60 and pressure chamber 70 that segregates the fluid within pump chamber 60 from the fluid within pressure chamber 70.

As discussed with respect to FIGS. 1-8, layers 24 and 25 imparted an expandable configuration to a portion of the sidewalls of pump chamber 60. In FIGS. 9-11, however, layers 24 and 25 impart an expandable configuration to a portion of the sidewalls of each of pump chamber 60 and pressure chamber 70. When the vertical thickness of pressure chamber 70 increases as fluid is pumped into pressure chamber 70, the vertical thickness of pump chamber 60 increases in a corresponding manner. Accordingly, the vertical thickness of pump chamber 60 is coupled to the vertical thickness of pressure chamber 70 in configurations where layers 24 and 25 form portions of both pump chamber 60 and pressure chamber 70.

Figure 12:
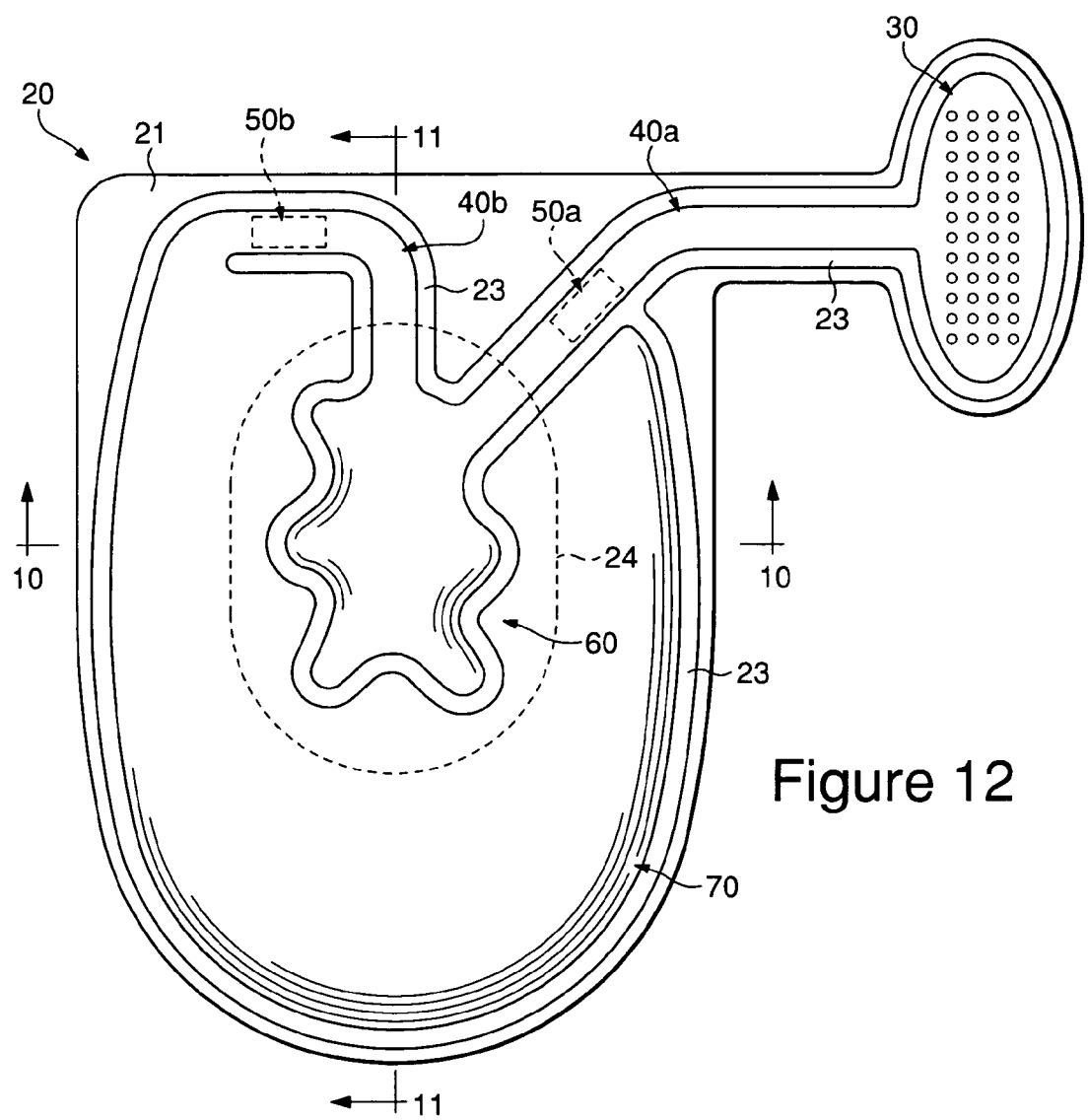
FIG. 12 is a top plan view of a variation of the second fluid system.

A variation upon the structure of fluid system 20 in FIG. 9 is depicted in FIG. 12. Bonding locations 23 are areas of fluid system 20 wherein layers 21 and 22 are bonded to each other, and bonding locations 23 define the various components of fluid system 20, including pump chamber 60 and pressure chamber 70. In FIG. 12, the portion of bonding locations 23 between pump chamber 60 and pressure chamber 70 has a wave-like configuration that may also assist with ensuring that pump chamber 60 remains expanded to increase the vertical thickness of pump chamber 60. That is, the combination of the wave-like configuration of bonding locations 23 and layers 24 and 25 imparts an expandable configuration to a portion of the sidewalls of each of pump chamber 60 and pressure chamber 70.

Based upon the above discussion, aspects of the invention involve a fluid system having a pump chamber and a pressure chamber that are in fluid communication. The pump chamber includes a first pair of layers and a second pair of layers. The first pair of layers form opposite surfaces of the pump chamber, and the second pair of layers are positioned between the first pair of layers and extend at least partially around the pump chamber. The layers are secured to each other to form a zigzag-shaped or W-shaped structure in the pump chamber. Additional aspects of the invention involve other structures or configurations that form an expandable pump chamber.

Multiple Pump Chambers

Figure 13:
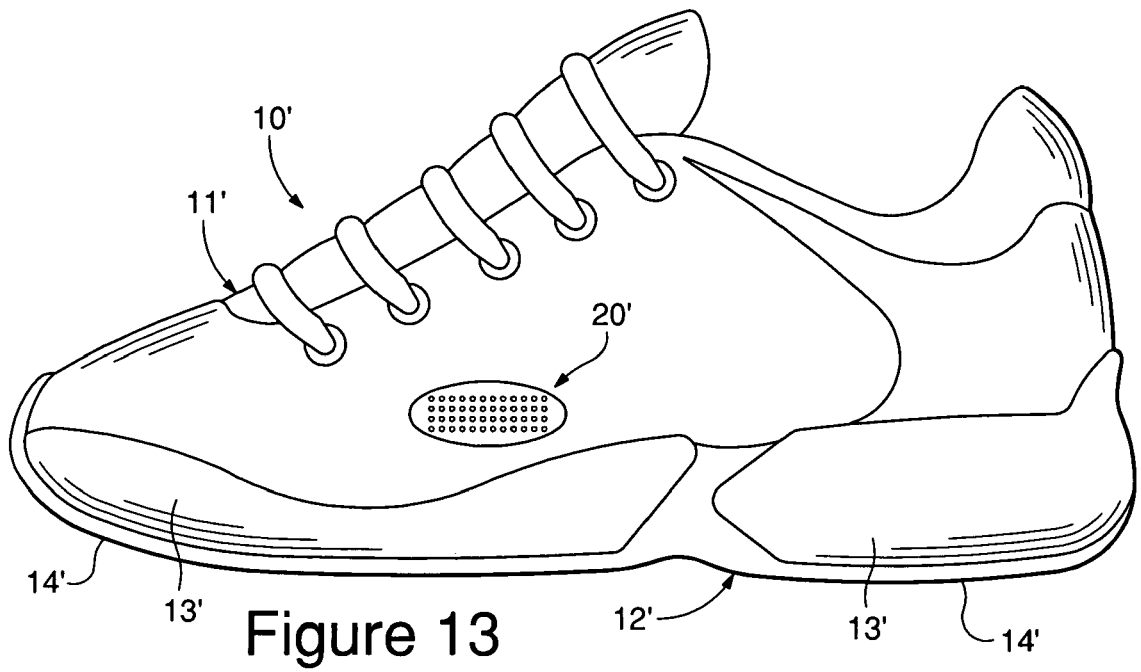
FIG. 13 is a lateral side elevational view of an article of footwear incorporating an exemplar third fluid system incorporating aspects of the invention.

An article of footwear. 10' is depicted in FIG. 13 and includes an upper 11' and a sole structure 12'. Upper 11' has a substantially conventional configuration formed of a plurality elements, such as textiles, foam, and leather materials, that are stitched or adhesively bonded together to form an interior void for securely and comfortably receiving a foot. Sole structure 12' is positioned below upper 11' and includes two primary elements, a midsole 13' and an outsole 14'. Midsole 13' is secured to a lower surface of upper 11', through stitching or adhesive bonding, for example, and operates to attenuate ground reaction forces as sole structure 12' contacts the ground, as during walking or running. Outsole 14' is secured to a lower surface of midsole 13' and is formed of a durable, wear-resistant material that engages the ground. In addition, sole structure 12' may include an insole 15', which located within the void in upper 11' and adjacent to the foot to enhance the comfort of article of footwear 10'.

Figure 14:
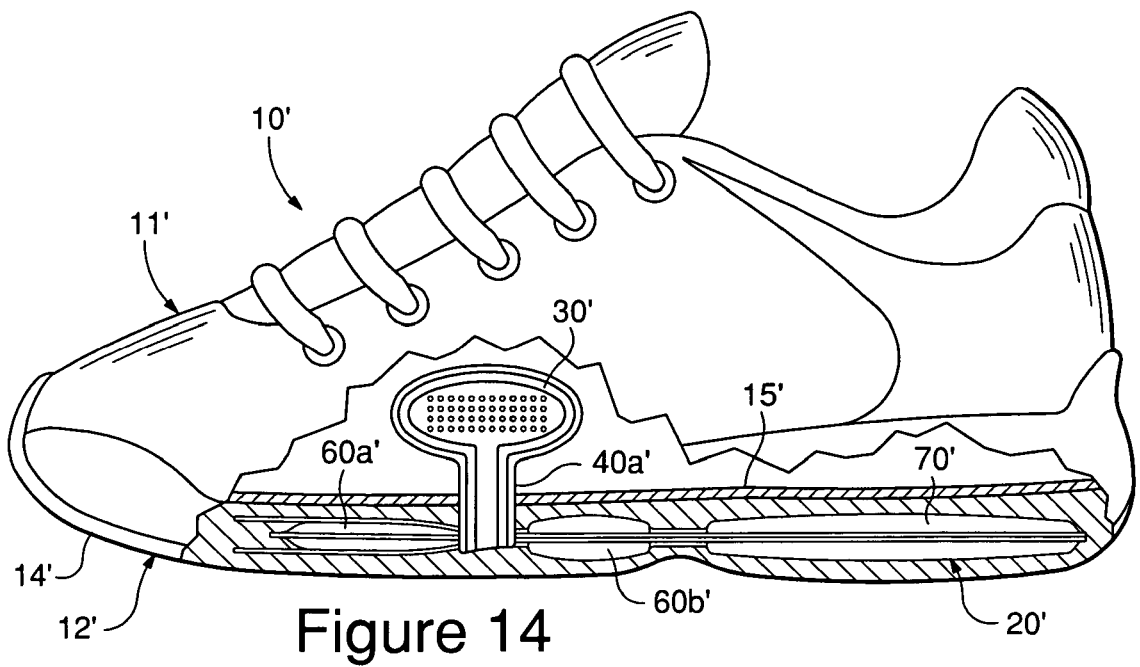
FIG. 14 is a partial cut-away view of the footwear depicting the third fluid system.

Midsole 13' is primarily formed of a polymer foam material, such as polyurethane or ethylvinylacetate, that at least partially encapsulates a fluid system 20'. As depicted in FIG. 14, fluid system 20' is positioned in both of a heel region and a forefoot region of midsole 13, but may be limited to one region of midsole 13 to impart a desired degree of force attenuation or stability, for example. Furthermore, midsole 13' may incorporate multiple fluid systems 20', with a first fluid system 20' being positioned in the heel region and a second fluid system 20' being positioned in the forefoot region, for example.

Figure 15:
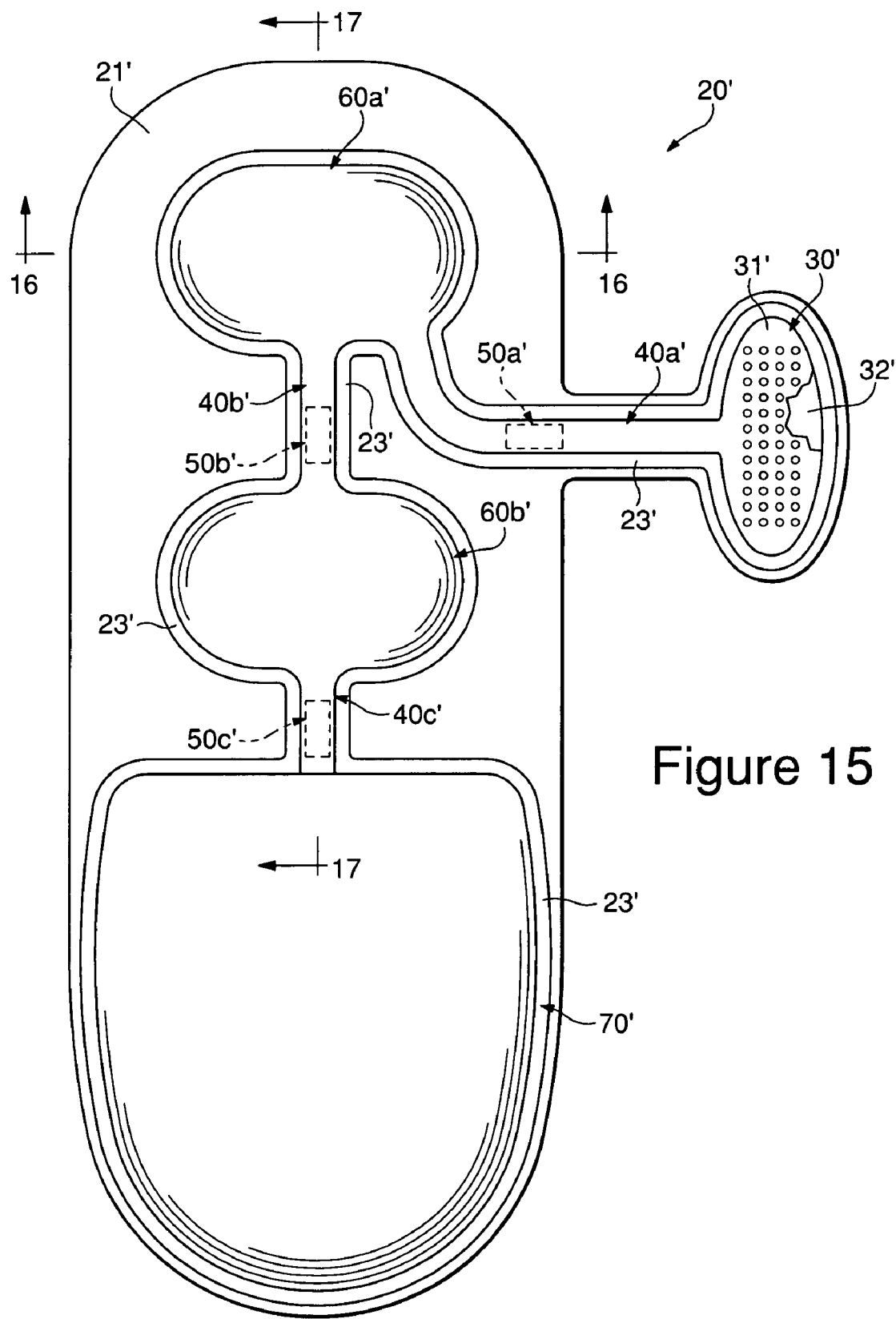
FIG. 15 is a top plan view of the third fluid system.

Fluid system 20' is depicted individually in FIGS. 15 and 16 and provides a structure that utilizes ambient air to impart additional force attenuation, for example, as sole structure 12' contacts the ground. In addition, fluid system 20' may impart stability, improve responsiveness, and enhance the ride characteristics of midsole 13'. The primary elements of fluid system 20' are a filter assembly 30', a three conduits 40a'-40c', three valves 50a'-50c' that are positioned within conduits 40a'-40c', respectively, a pair of pump chambers 60a' and 60b', and a pressure chamber 70'. In operation, a fluid, such as ambient air, is drawn into conduit 40a' by passing through filter assembly 30'. The fluid then passes through valve 50a' and into pump chamber 60a'. As pump chamber 60a' is compressed, the fluid enters conduit 40b' and passes through valve 50b' to enter pump chamber 60b'. As pump chamber 60b' is compressed, the fluid enters conduit 40c' and passes through valve 50c' to enter pressure chamber 70'. A combination of the fluid within pump chamber 60a', pump chamber 60b', and pressure chamber 70' imparts the ground reaction force attenuation, for example, that is provided by fluid system 20'. In some embodiments, however, a majority of the ground reaction force attenuation provided by fluid system 20' may be imparted by pressure chamber 70'.

As with fluid system 20, a pair of polymer layers 21' and 22' are bonded together at specific bonding locations 23' to define portions of filter assembly 30', conduits 40a'-40c', pump chambers 60a' and 60b', and pressure chamber 70'. That is, filter assembly 30', conduits 40a'-40c', pump chambers 60a' and 60b', and pressure chamber 70' are formed between unbonded positions of layers 21' and 22'. The position of conduit 40a' with respect to layers 21' and 22' is selected to provide a fluid path that extends between a fluid source, such as ambient air, and pump chamber 60a', thereby permitting the fluid to flow from filter assembly 30' to pump chamber 60a'. Conduit 40b' is positioned to extend between pump chambers 60a' and 60b', and conduit 40c' is positioned to extend between pump chamber 60b' and pressure chamber 70'.

A variety of materials are suitable for layers 21' and 22', including any of the materials discussed above for layers 21 and 22. Filter assembly 30', which includes a cover element 31' and a filter material 32', may also have the general configuration of filter assembly 30. Similarly, valves 50a', 50b', and 50c' may have the general configuration of valves 50a and 50b, and may also have the configuration of valve 100, which is described below with reference to FIGS. 22A-22G. Accordingly, many of the components of fluid system 20' may be analogous in structure and materials to the various components discussed above for fluid system 20.

The operation of fluid system 20' will now be discussed in detail. The pressure of the fluid within the various components of fluid system 20' changes depending upon the manner in which article of footwear 10' is utilized, the frequency at which sole structure 12' is compressed, and the force that compresses sole structure 12', for example. For purposes of the present discussion, the operation of fluid system 20', and the pressure of the fluid within the various components of fluid system 20' will be discussed with regard to an initial state, a transition state, and an equilibrium state. During the initial state, pump chambers 60a' and 60b' and pressure chamber 70' contain a fluid with an initial pressure that is substantially equal to the ambient pressure of air that surrounds article of footwear 10' and fluid system 20'. During the transition state, the pressure within pressure chamber 70' increases from the initial pressure to an equilibrium pressure, at which time fluid system 20' is in the equilibrium state.

Fluid system 20' may be positioned in midsole 13' so as to extend through the heel region and the forefoot region of footwear 10', as depicted in FIG. 14. More particularly, fluid system 20' may be positioned such that pressure chamber 70' is positioned directly below the calcaneus bone of the individual wearing article of footwear 10', and each of pump chambers 60a' and 60b' are positioned forward of pressure chamber 70'. When the individual takes a first step in article of footwear 10', sole structure 12' is compressed against the ground, which compresses both midsole 13' and fluid system 20'. Based upon the relative positions of the calcaneus bone, pump chambers 60a' and 60b', and pressure chamber 70', pressure chamber 70' bears a large portion of the force that causes the compression. As the foot rolls forward, however, the pressure upon pump chamber 60b' increases. The compression of pump chambers 60b' causes the pressure of the fluid within pump chamber 60b' to increase. When pressure differential between pump chamber 60b' and pressure chamber 70' exceed various pressure losses inherent in fluid system 20', the fluid within pump chamber 60b' passes through conduit 40c' and through valve 50c' to pass into pressure chamber 70'. That is, compressing pump chamber 60b' may cause a portion of the fluid within pump chamber 60b' to pass into pressure chamber 70'. This additional fluid within pressure chamber 70' causes the pressure within pressure chamber 70' to increase. As the foot rolls further forward, the pressure upon pump chamber 60a' increases. In a similar manner, therefore, the fluid within pump chamber 60a' passes through conduit 40b' and valve 50b' and into pump chamber 60b'. As the individual takes a first step, therefore, fluid system 20' is placed in the transition state due to increases in pressure of both of pump chambers 60a' and 60b' and pressure chamber 70'.

Valves 50a'-50c' are one-directional valves that permit fluid flow in a first direction, but limit or check fluid flow in an opposite second direction. Valve 50a' permits fluid to flow from filter assembly 30' to pump chamber 60a', but limits fluid flow in the opposite direction. When pump chamber 60a' is compressed, therefore, valve 50a' effectively prevents the fluid from flowing to filter assembly 30'. Valve 50b' permits fluid to flow from pump chamber 60a' to pump chamber 60b' when the pressure differential between pump chamber 60a' and pump chamber 60b' exceeds the pressure losses discussed above. Similarly, valve 50c' permits fluid to flow from pump chamber 60b' to pressure chamber 70', while inhibiting fluid flow in the opposite direction.

As the first step of the individual progresses, and the foot no longer places a significant force upon midsole 13', the compressive force exerted upon fluid system 20' decreases and midsole 13' returns to an uncompressed configuration. The pressure of the fluid within pressure chamber 70', however, remains elevated and fluid system 20' remains in the transition state. Due to the bonds between the polymer material of midsole 13' and layers 21' and 22', midsole 13' will place an outward force on pump chamber 60a' as midsole 13' returns to the uncompressed configuration. That is, the polymer material of midsole 13' may attempt to expand the compressed pump chamber 60a'. This action causes the pressure within pump chamber 60a' to become negative relative to the ambient pressure of the air outside of article of footwear 10' and fluid system 20'. Accordingly, a negative pressure differential is formed between pump chamber 60a' and the ambient air. Filter assembly 30' and conduit 40a' form a fluid path between the ambient air and pump chamber 60a'. When the negative pressure differential exceeds various pressure losses associated with fluid system 20', ambient air will pass through filter assembly 30', enter conduit 40a', pass through valve 50a', and enter pump chamber 60', thereby placing additional fluid within pump chamber 60a'. In other words, air will flow into pump chamber 60a' as midsole 13' expands from being compressed. The various pressure losses mentioned above may be associated with resistance from filter material 32', friction that occurs as the fluid passes through conduit 40a', and an opening pressure of valve 50a'.

The discussion above details the manner in which a first step of the individual compresses pump chambers 60a' and 60b' and causes a portion of the fluid within pump chamber 60b' to pass into pressure chamber 70', thereby increasing the pressure within pressure chamber 70'. Once the first step is completed and midsole 13' is not being compressed, additional air passes into pump chamber 60a' from the ambient air that surrounds article of footwear 10' and fluid system 20'. When the individual takes a second step and a plurality of further steps, the process described with respect to the first step repeats and the pressure of the fluid within pressure chamber 70' increases. Accordingly, fluid system 20' remains in the transition stage as the pressure within pressure chamber 70' rises.

Immediately prior to the first step, the pressure within pump chambers 60a' and 60b' and pressure chamber 70' was substantially equal to the ambient pressure of air. As midsole 13' was compressed, therefore, pump chambers 60a' and 60b' and pressure chamber 70' provided a relatively small degree of support. That is, the pressure of the fluid within pump chambers 60a' and 60b' and pressure chamber 70' was not sufficient to provide a relatively large degree of ground reaction force attenuation. As the individual continues to take steps and the pressure of the fluid within pressure chamber 70' increases, however, the degree of support and ground reaction force attenuation provided by pressure chamber 70' also increases. After a sufficient number of steps, the pressure within pressure chamber 70' becomes substantially equal to the pressure of pump chamber 60b' when compressed by the foot. When this occurs, the pressure differential between pump chamber 60b' and pressure chamber 70' becomes insufficient to induce further fluid transfer between pump chamber 60b' and pressure chamber 70'. Accordingly, the pressure of the fluid within pressure chamber 70' will eventually balance the compression of pump chamber 60b', and fluid system 20' will reach the equilibrium state.

Fluid system 20 included a single pump chamber 60. In contrast with fluid system 20, fluid system 20' includes pump chamber 60a' and pump chamber 60b'. An advantage of incorporating both of pump chambers 60a' and 60b' in fluid system 20' relates to the resulting pressure in pressure chamber 70'. More particularly, providing two pump chambers 60a' and 60b' in fluid system 20' increases the pressure in pressure chamber 70' beyond that of pressure chamber 70 once fluid system 20' attains the equilibrium state. That is, pressure chamber 70' will generally attain a higher pressure than pressure chamber 70.

When midsole 13 is in an uncompressed state, fluid is drawn into pump chamber 60 and has a pressure that is approximately equal to the pressure of ambient air that surrounds article of footwear 10 and fluid system 20. When midsole 13 is subsequently compressed by the foot, the pressure of the fluid within pump chamber 60 increases from ambient pressure to a higher pressure, which will be referred to as P max. Fluid is then transferred from pump chamber 60 to pressure chamber 70. As this process repeats, the highest pressure that pressure chamber 70 may theoretically attain is P max. Given the pressure losses discussed above and the fact that the increased pressure of pressure chamber 70 may limit the degree to which pump chamber 60 may be compressed, the actual highest pressure that pressure chamber 70 may attain is less than P max.

As a comparison, pressure chamber 70' will generally attain a higher pressure than pressure chamber 70. When midsole 13' is in an uncompressed state, fluid is drawn into pump chamber 60a' and has a pressure that is approximately equal to the pressure of ambient air that surrounds article of footwear 10' and fluid system 20'. When midsole 13' is subsequently compressed by the foot, the pressure of the fluid within pump chamber 60a' increases from ambient pressure to a higher pressure, which will be referred to as Pa max. Fluid is then transferred from pump chamber 60a' to pump chamber 60b'. A portion of that fluid is also transferred from pump chamber 60b' to pressure chamber 70'. As this process repeats, the highest pressure that pump chamber 60b' may theoretically attain due to fluid transfer from pump chamber 60a' to pump chamber 60b' is Pa max. As discussed below, however, pump chamber 60b' may attain a higher pressure than Pa max when compressed. Given the pressure losses discussed above and the fact that the increased pressure of pump chamber 60b' may limit the degree to which pump chamber 60a' may be compressed, the actual highest pressure that pump chamber 60a' attains may be less than Pa max.

As the pressure of the fluid within pump chamber 60b' increases toward Pa max, compressing midsole 13' will further increase the pressure within pump chamber 60b' to a level that is above Pa max. When midsole 13' is in an uncompressed state, therefore, the fluid in pump chamber 60b' attains a pressure that is approximately equal to Pa max. When midsole 13' is subsequently compressed by the foot, the pressure of the fluid within pump chamber 60b' increases from approximately Pa max to a higher pressure, which will be referred to as Pb max. Fluid is then transferred from pump chamber 60b' to pressure chamber 70. As this process repeats, the highest pressure that pressure chamber 70' may theoretically attain is Pb max. Given the pressure losses discussed above and the fact that the increased pressure of pressure chamber 70' may limit the degree to which pump chamber 60b' may be compressed, the actual highest pressure that pressure chamber 70' attains may be less than Pb max. In general, however, pressure chamber 70' will attain a higher pressure than pressure chamber 70 due to the presence of two pump chambers 60a' and 60b'.

Fluid system 20' may be formed through a process that involves heating layers 21' and 22' and utilizing a mold to bond layers 21' and 22' together at bonding locations 23'. Fluid system 20' may be formed, therefore, through a thermoforming process that is similar to the process discussed for fluid system 20. A variety of other processes may be utilized to form fluid system 20'. For example, layers 21' and 22' may be formed from flat thermoplastic sheets that are bonded together to define conduits 40a'-40c', pump chambers 60a' and 60b', and pressure chamber 70'. In addition, layers 21' and 22' may be separately formed to include indentations corresponding with elements of fluid system 20'. Furthermore, fluid system 20' or individual components of fluid system 20' may be manufactured through blow molding or rotational molding processes. In situations where individual components of fluid system 20' are formed separately, the individual components may be subsequently joined together to form fluid system 20' as described in U.S. patent application Ser. No. 10/351,876, which was filed Jan. 27, 2003 and is hereby entirely incorporated by reference.

The arrangement of the various components in fluid system 20' may be modified significantly to accommodate various applications. For example, the lengths of conduits 40a'-40c' may be modified such that pump chambers 60a' and 60b' may be positioned in the heel region of footwear 10'. Alternately, pressure chamber 70' may be positioned in the forefoot region. The relative volumes and shapes of pump chambers 60a' and 60b' and pressure chamber 70' may also vary significantly. As depicted in FIGS. 14 and 15, fluid system 20 is configured so that pump chambers 60a' and 60b' is separated from pressure chamber 70'. With reference to FIGS. 18-21, however, pressure chamber 70' extends around the side portion of pump chamber 60b'.

Figure 18:
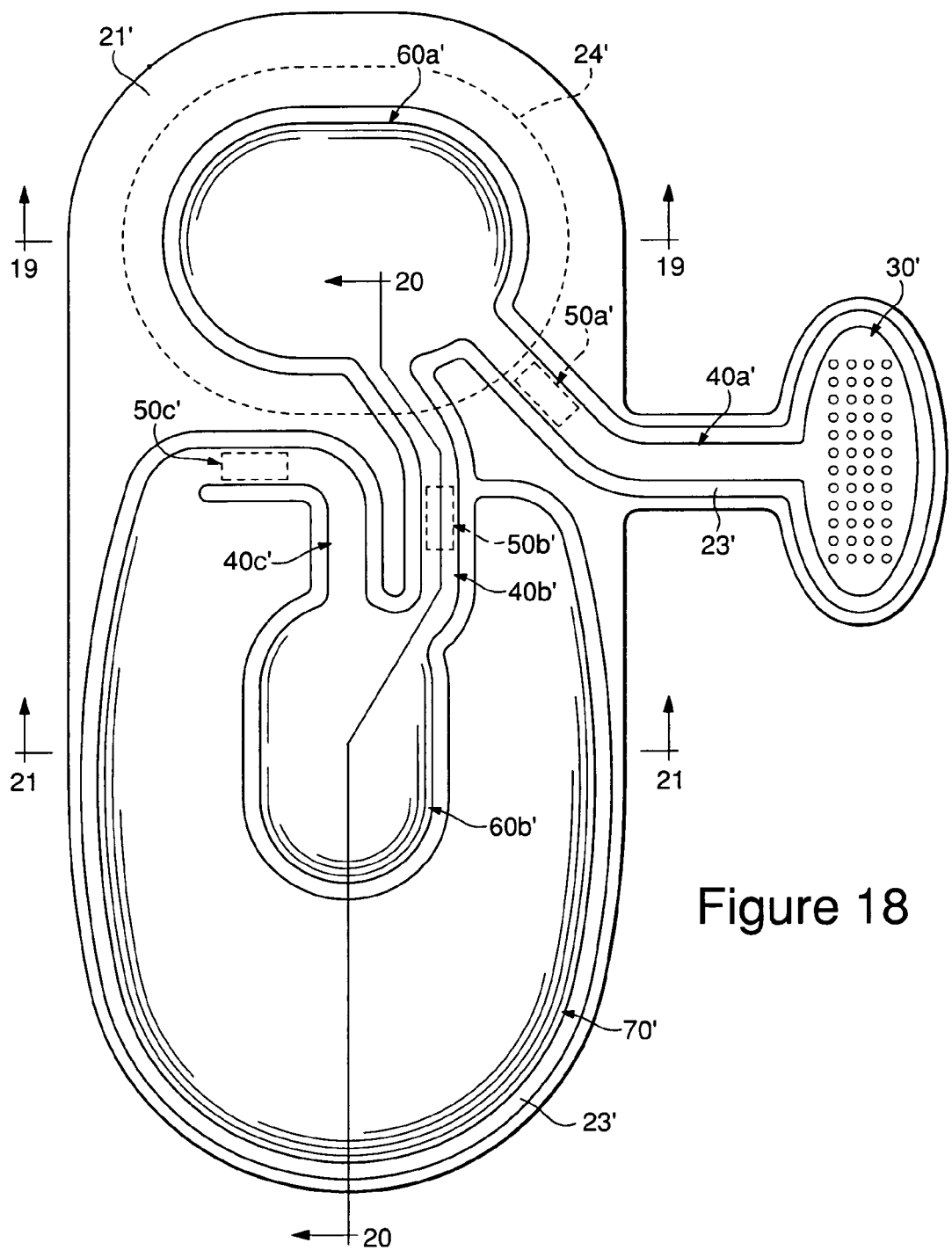
FIG. 18 is a top plan view of an exemplar fourth fluid system incorporating aspects of the invention.
Figure 19:
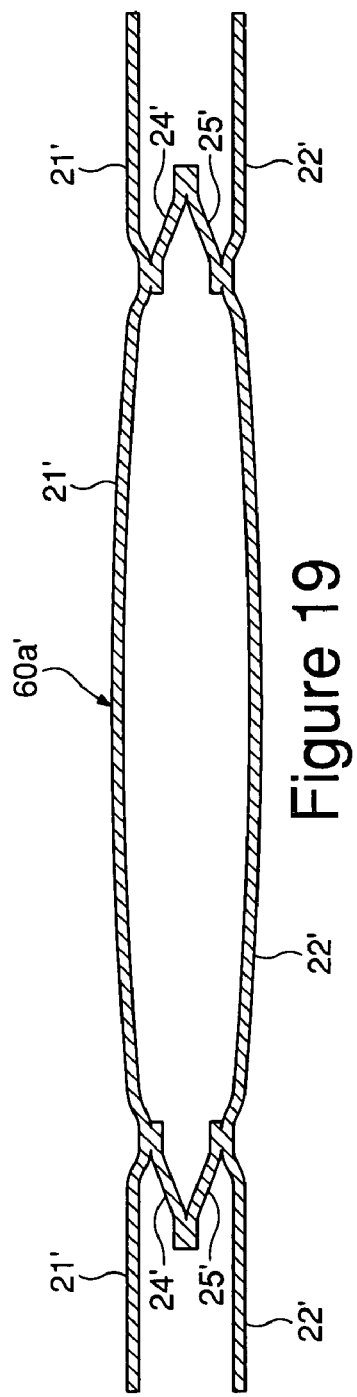
FIG. 19 is a first cross-sectional view of the fourth fluid system, as defined by section line 19-19 in FIG. 18.
Figure 20:
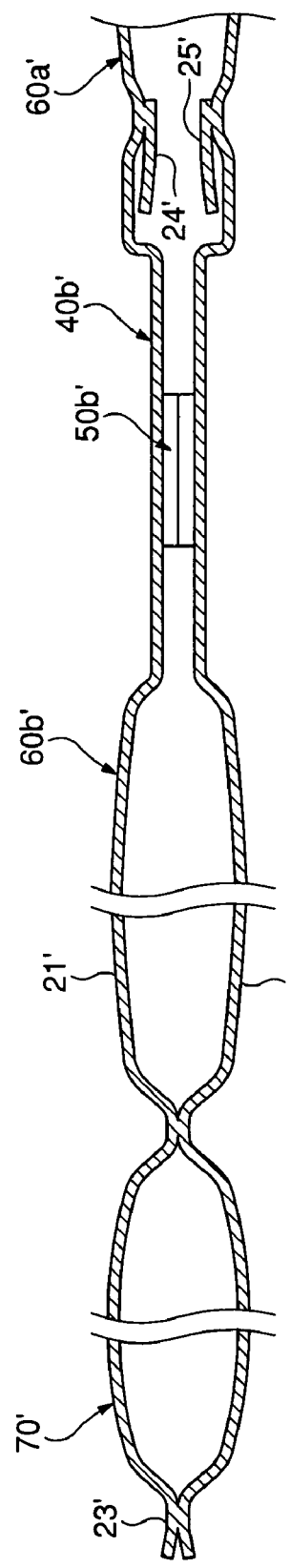
FIG. 20 is a second cross-sectional view of the fourth fluid system, as defined by section line 20-20 in FIG. 18.
Figure 21:
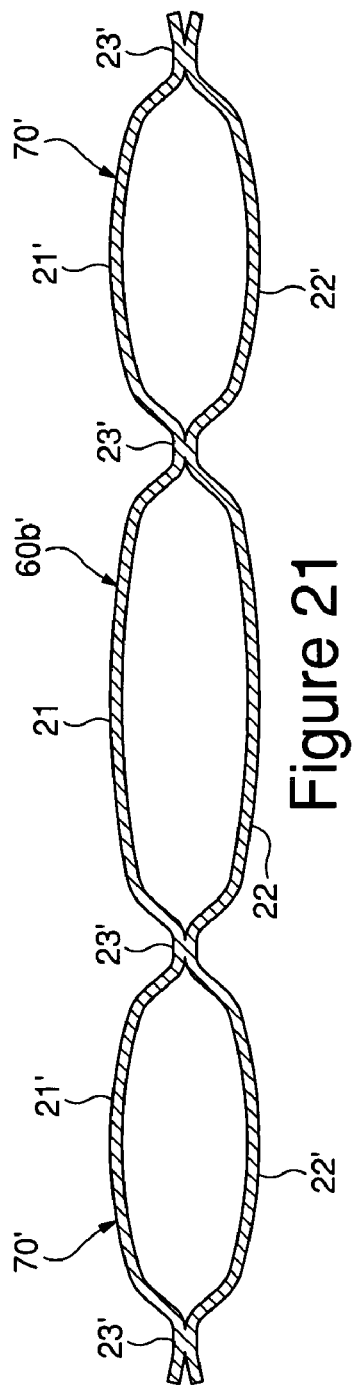
FIG. 21 is a third cross-sectional view of the fourth fluid system, as defined by section line 21-21 in FIG. 18.
Figure 22A:
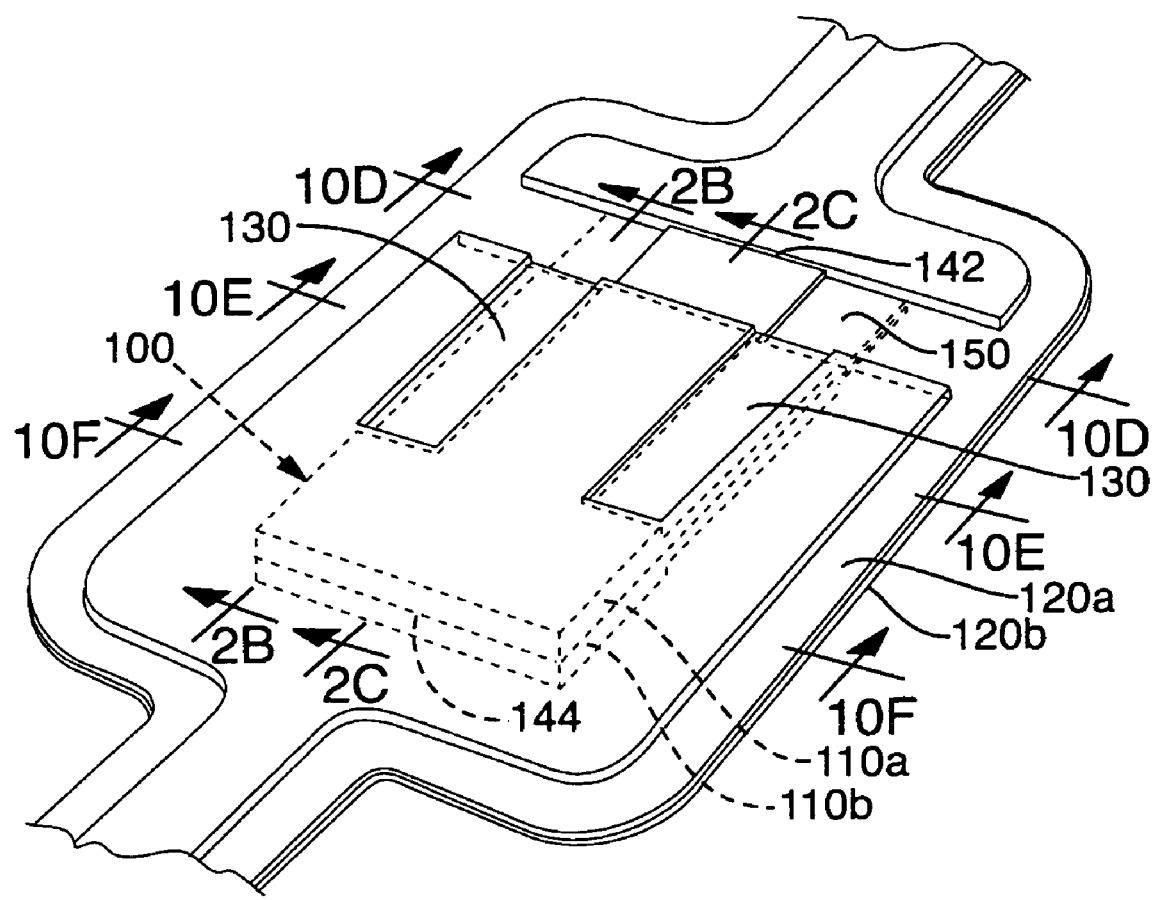
FIG. 22A is a perspective view of a valve suitable for use in the fluid system.
Figure 22B:
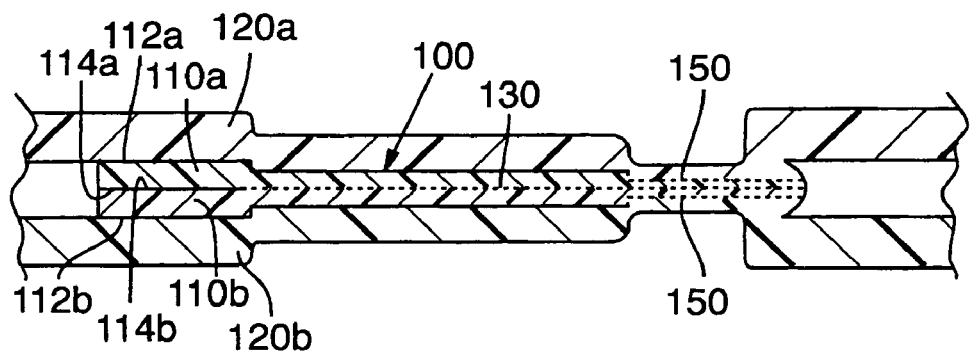
FIG. 22B is a first cross-sectional view of the valve, as defined by section line 22B-22B in FIG. 22A.
Figure 22C:
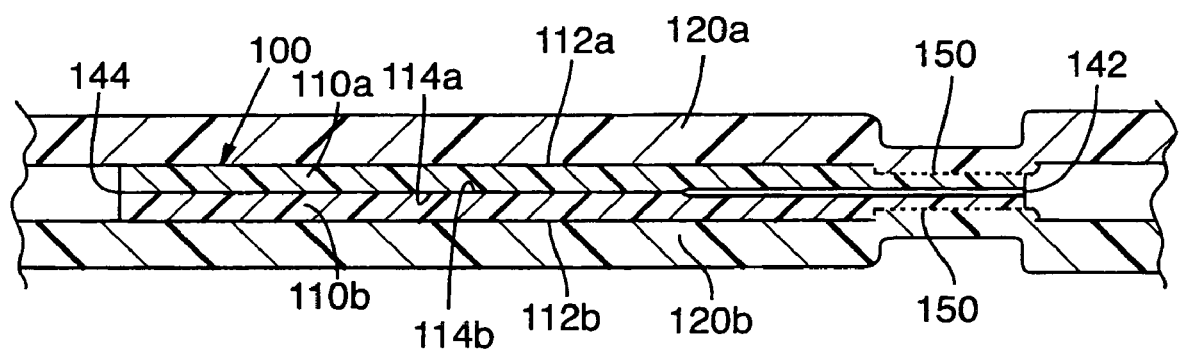
FIG. 22C is a second cross-sectional view of the valve, as defined by section line 22C-22C in FIG. 22A.
Figure 22D:
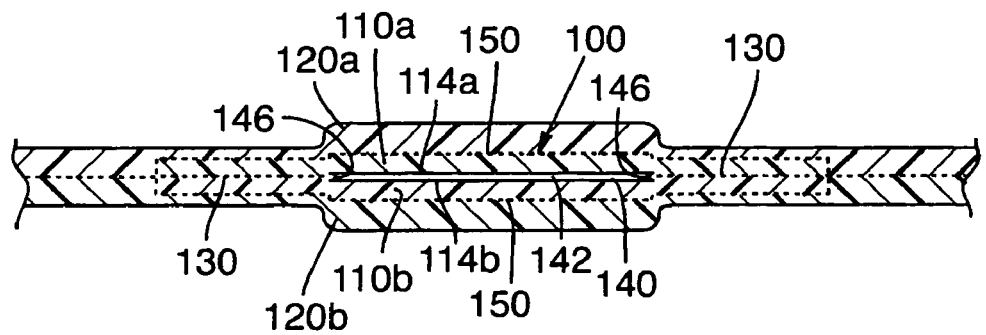
FIG. 22D is a third cross-sectional view of the valve, as defined by section line 22D-22D in FIG. 22A.
Figure 22E:
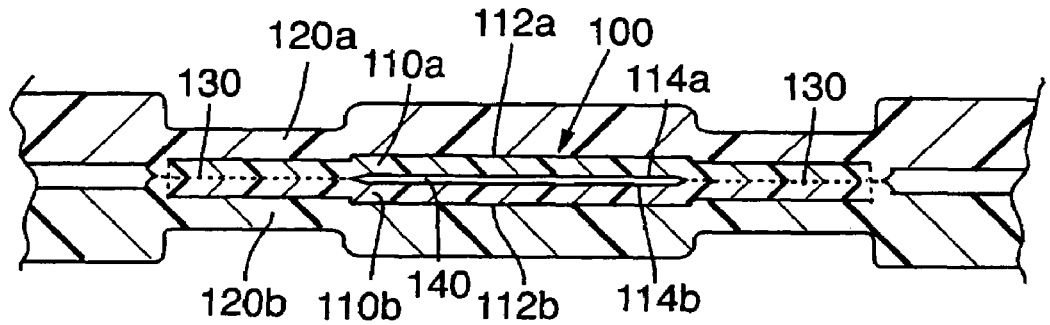
FIG. 22E is a fourth cross-sectional view of the valve, as defined by section line 22E-22E in FIG. 22A.
Figure 22F:
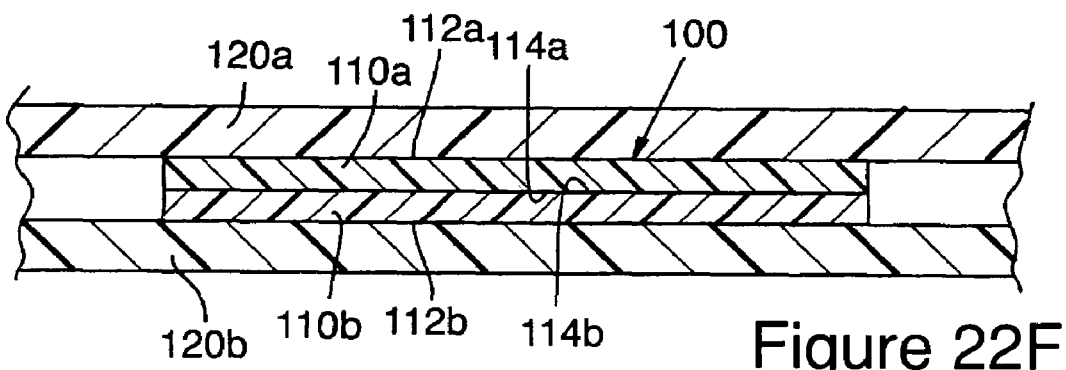
FIG. 22F is a fifth cross-sectional view of the valve, as defined by section line 22F-22F in FIG. 22A.
Figure 22G:
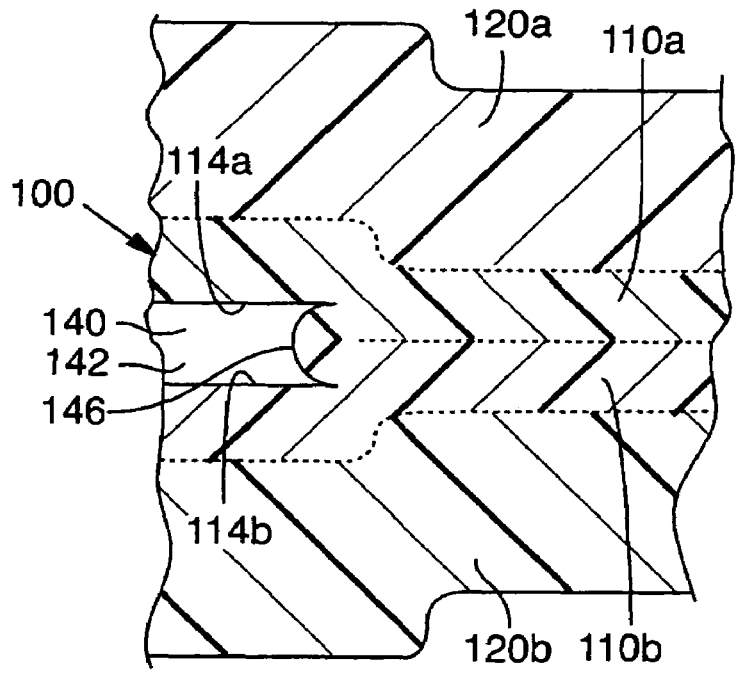
FIG. 22G is an enlarged view of a weld bead depicted in FIG. 22D.

Pressure chamber 70', as depicted in FIG. 18, forms a generally C-shaped structure with an interior area that accommodates pump chamber 60b'. In other embodiments of fluid system 20', however, pressure chamber 70' may extend around the side portion of pump chamber 60b' to a lesser or greater degree, or pressure chamber 70' may extend partially around pump chamber 60a'. In some aspects of the invention, portions of pressure chamber 70' may extend around both of pump chambers 60a' and 60b'.

Pump chamber 60a', as depicted in FIGS. 18-21, exhibits an expandable configuration that is similar to pump chamber 60. That is, a pair of layers 24' and 25' extend at least partially around pump chamber 60a' and form at least a portion of sidewalls of pump chamber 60a'. Each of layers 24' and 25' define an aperture. In forming pump chamber 60a', layer 24' is bonded to layer 21' at a first bonding location 27a', layer 25' is bonded to layer 22' at a second bonding location 27b', and layers 24' and 25' are bonded to each other at a third bonding location 27c'. This configuration forms a zigzag or accordion structure in the sidewalls of pump chamber 60a' that facilitates expansion of pump chamber 60a'. That is, the vertical thickness of pump chamber 60a' may increase substantially over a configuration wherein layers 21' and 22' are bonded to each other. In addition, this structure for the sidewalls of pump chamber 60a' imparts a self-expanding feature. That is, pump chamber 60a' may expand and inflate with fluid without other expansion structures.

Fluid system 20' is disclosed above and in the figures as incorporating pump chambers 60a' and 60b'. In further aspects of the invention, however, additional pump chambers may be incorporated into fluid system 20' or other fluid systems. FIGS. 18-21 demonstrate that the concepts associated with the fluid system 20 may be combined with fluid system 20'. In another aspects of the invention, pump chamber 60b' may exhibit the expandable configuration imparted by layers 24 and 25, or each of pump chambers 60a' and 60b' may exhibit an expandable configuration. In yet another aspect of the invention, pressure chamber 70 or pressure chamber 70' may exhibit the expandable configuration imparted by layers 24 and 25. Accordingly, the concepts discussed above may be applied in various forms.

Based upon the above discussion, aspects of the invention involve a fluid system having a first pump chamber and a second pump chamber with a compressible structure. A first fluid path extends between the first pump chamber and the second pump chamber to place the first pump chamber and the second pump chamber in fluid communication. The fluid system also includes a pressure chamber, and a second fluid path extends between the second pump chamber and the pressure chamber to place the second pump chamber and the pressure chamber in fluid communication. Additional aspects of the invention involve other structures or configurations with multiple pump chambers.

Valve Configuration

The structure of valve 100 will now be discussed in greater detail. Valve 100 has the general structure of one of a plurality of valves described in U.S. patent application Ser. No. 10/246,755, which was filed Sep. 19, 2002 and is hereby entirely incorporated by reference. A valve having the structure of valve 100 may be utilized as either or both of valves 50a and 50b to regulate the fluid flow within fluid system 20. Valve 100 may also be utilized as valves 50a', 50b', 50a", or 50b" to regulate the fluid flow within fluid systems 20' and 20". Valve 100 is depicted in FIGS. 22A-22G and includes a first valve layer 110a and a second valve layer 110b that are positioned between a first substrate layer 120a and a second substrate layer 120b. With respect to fluid system 20, for example, substrate layers 120 are analogous to polymer layers 21 and 22 that form conduits 40a and 40b. First valve layer 110a and second valve layer 110b are bonded together along opposite sides to form two channel welds 130 and define a channel 140 positioned between valve layers 110 and between channel welds 130. Channel 140 includes an inlet 142 and an outlet 144. Inlet 142 is biased in the open position by two inlet weld beads 146 formed of polymer material that collects in inlet 142 and adjacent to channel welds 130 during the bonding of first valve layer 110a and second valve layer 110b. Outlet 144 is located opposite inlet 142 and may be formed of unbonded portions of valve layers 110. Each valve layer 110 includes an outer surface 112 and an opposite inner surface 114. With regard to valve layer 110a, an outer surface 112a lies adjacent to substrate layer 120a and an inner surface 114a that lies adjacent to valve layer 110b. Similarly, valve layer 110b includes an outer surface 112b that lies adjacent to substrate layer 120b and an opposite inner surface 114b that lies adjacent to valve layer 110a.

Valve 100 also includes two substrate welds 150 that attach valve layers 110 to substrate layers 120. More specifically, substrate welds 150 attach valve layer 110a to substrate layer 120a and attach valve layer 110b to substrate layer 120b. As depicted in FIGS. 22A-22G, substrate welds 150 are located adjacent to inlet 142. Substrate welds 150 may also be positioned adjacent to other portions of valve 100.

In operation, valve 100 permits fluid flow through channel 140 and in the direction from inlet 142 to outlet 144. Valve 100, however, significantly limits fluid flow in the opposite direction. As noted, inlet weld beads 146 bias inlet 142 in the open position. This configuration ensures that the fluid in conduit 30 may enter at least the portion of channel 140 formed by inlet 142. The primary factor that determines whether the fluid may pass through valve 100 is the relative difference in pressure between the fluid in inlet 142 and the fluid at outlet 144. When the pressure of the fluid in inlet 142 exceeds the pressure of the fluid at outlet 144 plus an opening pressure of valve 100, the force that the fluid in inlet 142 exerts on inner surfaces 114 of valve layers 110 is sufficient to overcome the force that the fluid at outlet 144 exerts on outer surfaces 112, thereby permitting valve layers 110 to separate. When valve layers 110 separate, fluid may pass through channel 140. When the pressure of the fluid in inlet 142 is less than the pressure of the fluid at outlet 144, however, the force that the fluid in inlet 142 exerts on inner surfaces 114 of valve layers 110 is not sufficient to overcome the force that the fluid at outlet 142 exerts on outer surfaces 112, thereby preventing valve layers 110 from separating. When valve layers 110 are not separated, channel 140 is effectively closed to fluid transfer.

Outlet 144 assists in preventing the passage of fluid through valve 100 by ensuring that valve layers 110 make a hermetic contact. Note that channel welds 130 may extend less than the entire length of valve layers 110. Accordingly, outlet 144 may include unbonded portions of valve layers 110. The lack of bonds at outlet 144 permits unobstructed closure at outlet 144, thereby providing the hermetic contact between valve layers 110 that prevents fluid from passing between valve layers 110. Inner surfaces 114 may include a smooth, cohesive surface that facilitates closure of valve 100. Accordingly, the characteristics of inner surfaces 114 may also contribute to the hermetic contact and facilitate one-directional fluid flow through valve 100.

The materials forming valve layers 110 and substrate layers 120 should possess several characteristics. First, the materials should permit welds 130 and 150 to securely form between the various material layers using standard techniques, such as thermal contact, radio frequency energy, laser, and infrared welding. Second, the materials should also be substantially impermeable to fluids, such as air. Third, the materials should possess sufficient flexibility to permit valve 100 to operate as described above. Fourth, the materials should be possess a durability that permits valve 100 to operate through numerous cycles. Fifth, the materials may be chosen to resist hydrolysis, or chemical breakdown due to the presence of water, if water or water vapor may be present around valve 100. Based upon these considerations, suitable materials include thermoplastic polyurethane, urethane, polyvinyl chloride, and polyethylene. When valve 100 is formed of thermoplastic polyurethane, a suitable thickness for valve layers 110 is 0.018 inches, but may range from 0.004 inches to 0.035 inches, for example. Similarly, a suitable thickness for substrate layers 120 is 0.030 inches, but may range from 0.015 inches to 0.050 inches, for example. The thickness of valve layers 110 and the thickness of substrate layers 120 may depart from the ranges listed above, however, depending upon the specific application for valve 100, the materials and manufacturing methods utilized, and the properties that valve 100 is intended to impart to the fluid system.

A benefit to locating substrate welds 150 adjacent to inlet 142 lies in the relatively large area of outer surfaces 112 that are exposed to the fluid at outlet 144. As noted above, when the pressure of the fluid in inlet 142 is less than the pressure of the fluid at outlet 144, the force that the fluid in inlet 142 exerts on inner surface 114 of valve layers 110 is not sufficient to overcome the force that the fluid at outlet 144 exerts on outer surfaces 112, thereby preventing valve layers 110 from separating and preventing the flow of fluid through valve 100. By configuring the position of valve layers 110 such that a relatively large area of outer surfaces 112 are exposed to the fluid at outlet 144, the area of contact between inner surfaces 114 increases proportionally. The primary mechanism that prevents fluid from passing through valve 100 is the hermetic contact properties of inner surfaces 114. Accordingly, increased efficiency is achieved by having a relatively large portion of outer surfaces 112 exposed to the fluid at outlet 144.

As an alternative, valve 100 may be formed from a single valve layer 110 that is bonded with one of the substrate layers 120 to form channel welds 130. Accordingly, channel 140 may be formed between channel welds 130 and between the valve layer 110 and the substrate layer 120. The alternative valve 100 operates in a manner that is substantially similar to the operation of valve 100. In addition, valve 100 may be formed such that channel welds 130 extend around and enclose outlet 144. An aperture may then be formed in one of valve layers 110 to permit the fluid to pass through valve 100. In either alternative embodiment, contact between valve layer 110 and the substrate layer 120 effectively closes valve 100.

As discussed above, when the pressure of the fluid in inlet 142 is less than the pressure of the fluid at outlet 144, the force that the fluid in inlet 142 exerts on inner surfaces 114 of valve layers 110 is not sufficient to overcome the force that the fluid at outlet 142 exerts on outer surfaces 112, thereby preventing valve layers 110 from separating. When valve layers 110 are not separated, channel 140 is effectively closed to fluid transfer. If, however, particulates are positioned within valve 100 and between valve layers 110, the fluid may be able to pass through valve 100 in the direction of outlet 144 to inlet 142. That is, the effectiveness of valve 100 in preventing fluid transfer in the direction from outlet 144 to inlet 142 may be compromised by the presence of particulates 74.

Conclusion

The preceding discussion and accompanying figures disclosed fluid systems 20 and 20' in connection with articles of footwear 10 and 10'. More particularly, fluid systems 20 and 20' were disclosed as inflating a chamber in a sole structure. In other aspects of the invention, fluid systems 20 and 20' may inflate a chamber in an upper. Concepts related to fluid systems 20 and 20' may also be applied to a variety of other products. As an example, an expanded pump chamber or multiple pump chambers may be incorporated into a fluid system that inflates game balls, such as a soccerball or volleyball. Similar concepts may also be incorporated into inflatable seat cushions or other devices. Accordingly, aspects of the present invention have application in various technical areas, in addition to footwear.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A fluid system having a pump chamber and a pressure chamber that are in fluid communication, the pump chamber comprising:
   a first pair of layers forming opposite surfaces of the pump chamber; and
   a second pair of layers positioned between the first pair of layers and extending at least partially around the pump chamber, the second pair of layers defining apertures,
   wherein the first pair of layers are secured to the second pair of layers to define at least two first bonds, and the second pair of layers are secured to each other to define a second bond that is offset from the first bonds, the layers and bonds forming a zigzag-shaped structure in the pump chamber.

2. The fluid system recited in claim 1, wherein the fluid system is incorporated into an article of footwear.

3. The fluid system recited in claim 2, wherein the fluid system is at least partially incorporated into a sole structure of the article of footwear.

4. The fluid system recited in claim 3, wherein the fluid system is at least partially encapsulated in a polymer foam material of the sole structure.

5. The fluid system recited in claim 1, wherein the first bonds are spaced from the apertures, and the second bond is adjacent the apertures.

6. The fluid system recited in claim 1, wherein the first bonds are aligned through a thickness of the pump chamber.

7. The fluid system recited in claim 1, wherein the pump chamber is positioned adjacent the pressure chamber and the second pair of layers extend between the pump chamber and the pressure chamber to segregate fluids within the pump chamber and the pressure chamber.

8. The fluid system recited in claim 1, wherein a blocking material is positioned between portions of the first pair of layers and the second pair of layers.

9. The fluid system recited in claim 1, further including another pump chamber that is in fluid communication with the pump chamber.

10. A fluid system comprising:
    a first pair of layers defining at least a portion of a pump chamber and a pressure chamber that are in fluid communication; and
    a second pair of layers positioned between the first pair of layers and extending at least partially around the pump chamber to form at least a portion of an exterior surface of the pump chamber, the second pair of layers defining apertures,
    wherein the first pair of layers are secured to the second pair of layers to define at least two first bonds that are spaced from the apertures and aligned through a thickness of the pump chamber, and the second pair of layers are secured to each other to define a second bond that is adjacent to the apertures, the layers and bonds forming a W-shaped structure in the pump chamber.

11. The fluid system recited in claim 10, wherein the fluid system is incorporated into an article of footwear.

12. The fluid system recited in claim 11, wherein the fluid system is at least partially incorporated into a sole structure of the article of footwear.

13. The fluid system recited in claim 12, wherein the fluid system is at least partially encapsulated in a polymer foam material of the sole structure.

14. The fluid system recited in claim 10, wherein the pump chamber is positioned adjacent the pressure chamber and the second pair of layers extend between the pump chamber and the pressure chamber to segregate fluids within the pump chamber and the pressure chamber.

15. The fluid system recited in claim 10, wherein the first pair of layers define a conduit that extends between the pump chamber and the pressure chamber, and at least one valve layer is positioned within the conduit to form a valve that permits fluid flow from the pump chamber to the pressure chamber and limits fluid flow from the pressure chamber to the pump chamber.

16. The fluid system recited in claim 15, wherein the second bond is absent in a portion of the conduit.

17. The fluid system recited in claim 10, wherein a blocking material is positioned between portions of the first pair of layers and the second pair of layers.

18. The fluid system recited in claim 10, wherein the second pair of layers are unbonded to each other in a position that is between the first bonds.

19. The fluid system recited in claim 10, further including another pump chamber that is in fluid communication with the pump chamber.

20. A fluid system comprising:
a pump chamber having a pair of opposite surfaces and a sidewall extending between the opposite surfaces, the pump chamber including a first pair of layers and a second pair of layers, the first pair of layers forming the opposite surfaces of the pump chamber, and the second pair of layers forming the sidewall, the second pair of layers being positioned between the first pair of layers and extending at least partially around the pump chamber, the second pair of layers defining apertures, the first pair of layers being secured to the second pair of layers to define at least two first bonds, and the second pair of layers being secured to each other to define a second bond that is offset from at least one of the first bonds;
a pressure chamber;
a first fluid path extending between the pump chamber and the pressure chamber to place the pump chamber and the pressure chamber in fluid communication;
a first valve positioned within the first fluid path to permit fluid flow from the pump chamber to the pressure chamber and to limit fluid flow from the pressure chamber to the pump chamber;
a second fluid path extending from an exterior of the fluid system to the pump chamber to place the pump chamber in fluid communication with the exterior of the fluid system; and
a second valve positioned within the second fluid path to permit fluid flow from the exterior to the pump chamber and to limit fluid flow from the pump chamber to the exterior.

21. The fluid system recited in claim 20, wherein the fluid system is incorporated into an article of footwear.

22. The fluid system recited in claim 21, wherein the fluid system is at least partially incorporated into a sole structure of the article of footwear.

23. The fluid system recited in claim 22, wherein the fluid system is at least partially encapsulated in a polymer foam material of the sole structure.

24. The fluid system recited in claim 20, wherein the apertures are aligned, the first bonds are spaced from the apertures, and the second bond is adjacent the apertures.

25. The fluid system recited in claim 20, wherein the first bonds are aligned through a thickness of the pump chamber.

26. The fluid system recited in claim 20, wherein the second pair of layers are unbonded to each other in a position that is between the first bonds.

27. The fluid system recited in claim 20, wherein the pump chamber is positioned adjacent the pressure chamber and the second pair of layers extend between the pump chamber and the pressure chamber to segregate fluids within the pump chamber and the pressure chamber.

28. The fluid system recited in claim 27, wherein a portion of the first bonds are located between the pump chamber and the pressure chamber have a wave-like configuration.

29. The fluid system recited in claim 20, wherein a blocking material is positioned between portions of the first pair of layers and the second pair of layers.

30. The fluid system recited in claim 20, wherein the layers and bonds form a W-shaped structure in the pump chamber.

31. The fluid system recited in claim 20, further including another pump chamber that is in fluid communication with the pump chamber.

32. A method of manufacturing a chamber for a fluid system, the method comprising steps of:
providing a first layer, a second layer, a third layer, and a fourth layer formed from a polymer material;
defining an aperture in each of the second layer and the third layer;
positioning the second layer and the third layer between the first layer and the fourth layer; and
bonding the first layer to the second layer, bonding the second layer to the third layer, and bonding the third layer to the fourth layer to form an expandable sidewall of the chamber.

33. The method recited in claim 32, wherein the step of bonding includes locating a bond between the second layer and the third layer adjacent to the aperture.

34. The method recited in claim 32, wherein the step of bonding includes aligning a bond between the first layer and the second layers with a bond between the third layer and the fourth layer.

35. The method recited in claim 32, wherein the step of bonding includes structuring the layers to have a W-shaped configuration.

36. The method recited in claim 32, further including a step of locating a blocking material between a portion of the first layer and the second layer, the second layer and the third layer, and the third layer and the fourth layer.

* * * * *